(12) United States Patent
Tabor et al.

(10) Patent No.: US 9,280,508 B1
(45) Date of Patent: Mar. 8, 2016

(54) APPARATUS AND METHOD FOR INTEROPERABILITY BETWEEN SAS AND PCI EXPRESS

(71) Applicant: PMC-Sierra US, Inc., Sunnyvale, CA (US)

(72) Inventors: Gregory Arthur Tabor, Colorado Springs, CO (US); Larrie Simon Carr, Kelowna (CA); Richard David Sodke, Burnaby (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 338 days.

(21) Appl. No.: 14/042,132

(22) Filed: Sep. 30, 2013

(51) Int. Cl.
*G06F 13/20* (2006.01)
*G06F 13/14* (2006.01)
*G06F 13/36* (2006.01)
*G06F 13/40* (2006.01)

(52) U.S. Cl.
CPC .................................. *G06F 13/4022* (2013.01)

(58) Field of Classification Search
None
See application file for complete search history.

(56) References Cited

U.S. PATENT DOCUMENTS

| | | | |
|---|---|---|---|
| 7,917,682 | B2 | 3/2011 | Bakthavathsalam |
| 2008/0162811 | A1* | 7/2008 | Steinmetz ........... G06F 13/4234 711/114 |
| 2008/0195747 | A1 | 8/2008 | Elmaliah |
| 2008/0228897 | A1 | 9/2008 | Ko |
| 2011/0004710 | A1* | 1/2011 | Stenfort .................. G06F 3/061 710/51 |
| 2014/0372637 | A1* | 12/2014 | Voorhees ............ G06F 13/4295 710/52 |

OTHER PUBLICATIONS

LSI Corporation, "LSISS9252—6Gb/s SAS-to-SATA Interposer Solution for 2.5" and 3.5" Hard Drives", Product Brief, Jul. 2009, 2 pages.
"InterOperability Laboratory: Services: Testing: Fibre Channel: Knowledgebase", https://www.iol.unh.edu/services/testing/fc/knowledgebase/tutorials/fc_tutorial.php, Retrieved online Aug. 8, 2013, 15 pages.
Zhang, "A Not So Short iSCSI Tutorial", HPCL, University of Rhode Island, Oct. 2003, 37 pages.
"Protocol Multiplexing", PCI Express 3.0 Revision 0.9, Jun. 17, 2010, pp. 1-28.
"T10 Working Drafts" http://t10.org/drafts.htm, Retrieved online Sep. 27, 2013, 18 pages.
"PCI Express Base Specification Revision 3.0", Nov. 10, 2010, pp. 1-860.
Matthews, "NVM Express: SCSI Translation Reference", Apr. 11, 2012, 44 pages.
Huffman, "NVM Express", Revision 1.1, Oct. 11, 2012, pp. 1-163.
Huffman, "NVM Express", Revision 1.1a, Sep. 23, 2013, pp. 1-166.
Huffman, "Non-Volatile Memory Host Controller Interface (NVMHCI) 1.0", Apr. 14, 2008, pp. 1-65.
"Enterprise SSD Form Factor", Version 1.0, SSD Form Factor Working Group, Dec. 20, 2011, pp. 1-56.
Myers, "Enterprise SSD Form Factor", Version 1.0a, SSD Form Factor Work Group, Dec. 12, 2012, pp. 1-55.
Hufferd, "Fibre Channel over Ethernet (FCoE)", Storage Networking Industry Association, 2011, pp. 1-78.

* cited by examiner

*Primary Examiner* — David E Martinez
(74) *Attorney, Agent, or Firm* — Dennis R. Haszko

(57) ABSTRACT

Provided is an apparatus and method for enabling interoperability between a serial attached small computer system interface (SAS) protocol with a peripheral component interconnect express (PCIe) protocol. A SAS-PCIe bridge includes a SAS component configured to communicate with a SAS device in a SAS domain and a PCIe component configured to communicate with a PCIe switch in a PCIe domain. The SAS component and the PCIe component are configured to convert data between the SAS protocol and the PCIe protocol.

19 Claims, 22 Drawing Sheets

APPARATUS AND METHOD FOR INTEROPERABILITY BETWEEN SAS AND PCI EXPRESS

FIELD

The present disclosure relates generally to enterprise data storage, and more particularly, connecting serial attached small computer system interface (SAS) domain with a peripheral component interconnect express (PCIe) domain.

BACKGROUND

SAS is a prominent technology for implementing enterprise storage systems and is primarily used as a hard disk drive (HDD) attachment technology within enterprise storage system designs. PCIe is a popular computer bus technology used in industry standard server designs and may be used as an interface for attaching high performance solid state disk (SSD) devices. The incumbent popularity of SAS as a scalable storage interconnect combined with recent proposals for high performance PCIe based storage protocols including small computer system interface (SCSI) express and non-volatile memory (NVM) express are driving a desire to intermix these storage technologies in new enterprise storage system designs.

SAS is a serial interconnect technology and PCIe is a input/output bus protocol. SAS and PCIe may have different performance characteristics and targeted applications.

SAS is a technology for transporting SCSI protocol, and it is a prominent technology for connecting storage devices such as HDDs to host bus adapters (HBAs) and redundant array of independent disks (RAID) controllers that use SCSI protocol as a higher layer data transfer protocol. SAS is popular because it is relatively low cost, is highly scalable, and provides high bandwidth. SAS protocol was originally conceived as an efficient and high-bandwidth interconnect for hundreds to thousands of relatively low performance, high-capacity HDDs. Numerous storage component vendors support SAS protocol in their components, and the majority of storage system vendors use SAS as the HDD interconnect in their system designs.

PCIe is also a high-bandwidth interconnect for general computer peripheral devices, and it provides very low latency data transfers between a host computer and a peripheral device. New storage protocols such as SCSI express and NVM express use PCIe as an underlying transport technology. These protocols are fundamentally intended for use with low latency storage devices such as SSDs. Low cost PCIe switches are readily available and can provide limited scalability to support fan out to multiple storage devices. However, PCIe lacks the scalability required for enterprise storage arrays and is not considered a suitable replacement for SAS as a transport technology for high capacity storage systems.

As PCIe is a packet-switched network it does not suffer from the same connection-blocking problem as SAS technology. However, high-capacity drives may not be developed for PCIe interfaces due to the prevalence of serial advanced technology attachment (SATA) interfaces on desktop, notebook, and server CPU chipsets.

In some implementations, it is desirable to have storage systems that support both high-performance PCIe storage devices and high-capacity SAS or SATA storage devices.

Market dynamics are driving some enterprise storage system designers toward designs that support intermixing storage devices with both SAS and PCIe interfaces in the same system.

BRIEF DESCRIPTION OF THE DRAWINGS

Embodiments of the present disclosure will now be described, by way of example only, with reference to the attached Figures.

DETAILED DESCRIPTION

Figure 1:
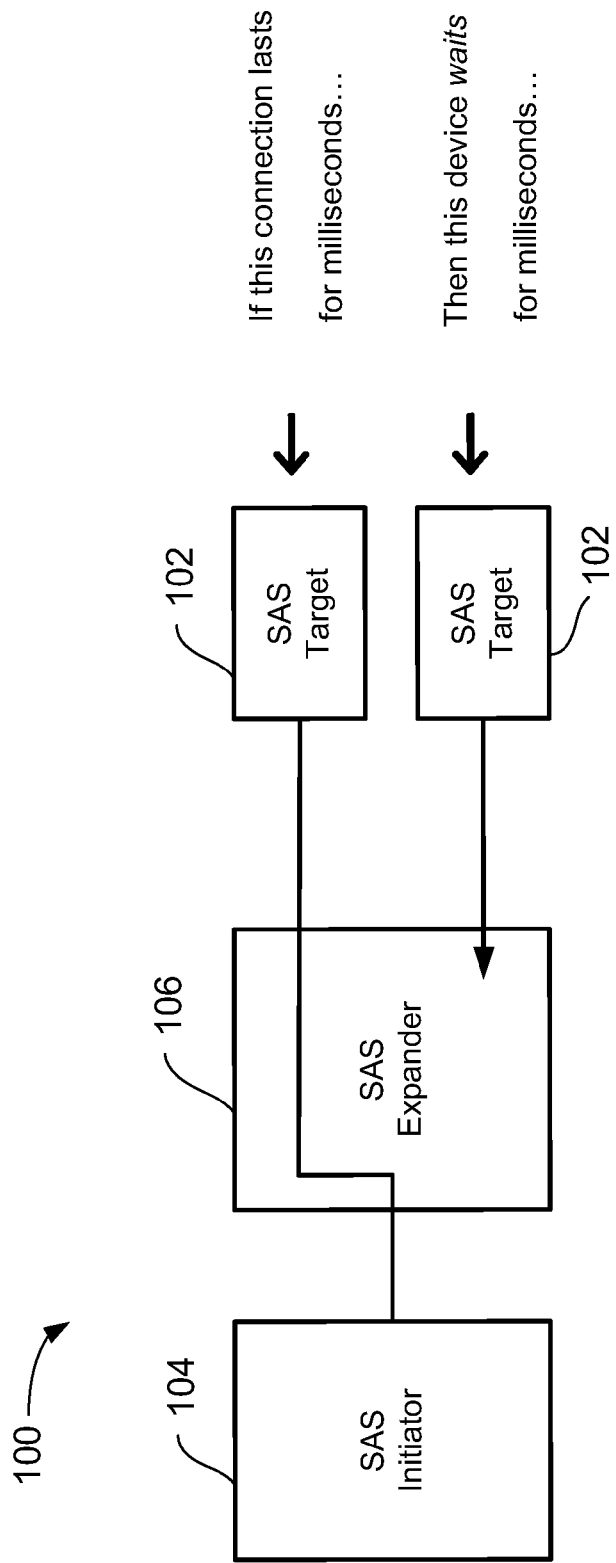
FIG. 1 is a block diagram of SAS connection blocking.

It is an object of the present disclosure to obviate or mitigate at least one disadvantage of previous systems.

A method to transport connection-based SAS protocol across PCIe links is disclosed. The method uses proprietary bridges that connect to native SAS devices and convert SAS link layer protocol to and from PCIe transport layer packets (TLPs). On the SAS side, this bridge presents itself as a SAS expander, and on the PCIe side this bridge presents itself as a PCIe endpoint. In this manner, SAS devices can co-exist with PCIe devices in an enterprise storage system that uses PCIe as the main system interconnect.

In an embodiment, the present disclosure provides a serial attached small computer system interface (SAS)—peripheral component interconnect express (PCIe) bridge for enabling interoperability between a SAS protocol and a PCIe protocol. The SAS-PCIe bridge includes a SAS component configured to communicate with a SAS device in a SAS domain and a PCIe component configured to communicate with a PCIe switch in a PCIe domain. The SAS component and the PCIe component are configured to convert data between the SAS protocol and the PCIe protocol.

In a further aspect, the data includes SAS data having SAS link layer primitives and frames and the PCIe component is configured to encapsulate the SAS link layer primitives and frames into PCIe packets.

In a further aspect, the SAS component is configured to receive the SAS data from a SAS device in the SAS domain and the PCIe component is configured to send the PCIe packets to a second SAS-PCIe bridge in the PCIe domain.

In a further aspect, the second SAS-PCIe bridge is configured to regenerate the SAS data from the PCIe packets.

In a further aspect, the data includes PCIe data having PCIe packets and the PCIe component is configured to generate SAS link layer primitives and frames from the PCIe packets.

In a further aspect, the PCIe component is configured to receive the PCIe packets and the SAS component is configured to send the SAS link layer primitives and frames to the SAS device in the SAS domain.

In a further aspect, the SAS component is presented to the SAS device as a standard SAS expander.

In a further aspect, the SAS component and the PCIe component convert the data between the SAS protocol and the PCIe protocol using PCIe memory write transport layer packets.

In a further aspect, the SAS component and the PCIe component convert the data between the SAS protocol and the PCIe protocol using PCIe protocol multiplexing extensions.

In a further aspect, the SAS component and the PCIe component convert the data between the SAS protocol and the PCIe protocol using proprietary PCIe packets.

In an embodiment, the present disclosure provides a method for enabling interoperability between a serial attached small computer system interface (SAS) protocol and a peripheral component interconnect express (PCIe) protocol. The method includes receiving SAS link layer primitives and frames from a SAS device in a SAS domain, encapsulating the SAS link layer primitives and frames into PCIe packets, and sending the PCIe packets to a PCIe switch in a PCIe domain.

In an embodiment, the present disclosure provides a method for enabling interoperability between a serial attached small computer system interface (SAS) protocol and a peripheral component interconnect express (PCIe) protocol. The method includes receiving PCIe packets from a PCIe switch in a PCIe domain, generating SAS link layer primitives and frames from the PCIe packets, and sending the SAS link layer primitives and frames to a SAS device in the SAS domain.

In a further aspect, the PCIe packets include PCIe memory write transport layer packets. In a further aspect, the PCIe packets use PCIe protocol multiplexing extensions. In a further aspect, the PCIe packets include proprietary PCIe packets.

In an embodiment, the present disclosure provides a data communications device including a serial attached small computer system interface (SAS)—peripheral component interconnect express (PCIe) bridge for enabling interoperability between a SAS protocol and a PCIe protocol. The SAS-PCIe bridge includes a SAS component configured to communicate with a SAS device in a SAS domain and a PCIe component configured to communicate with a PCIe switch in a PCIe domain. The SAS component and the PCIe component being configured to convert data between the SAS protocol and the PCIe protocol.

In a further aspect, the data communications device includes an input-output controller.

Other aspects and features of the present disclosure will become apparent to those ordinarily skilled in the art upon review of the following description of specific embodiments in conjunction with the accompanying figures.

Generally, the present disclosure provides a method and system for transporting serial attached small computer system interface protocol data across a peripheral component interconnect express link.

FIG. 1 illustrates a block diagram of Serial Attached Small Computer System Interface (SAS) connection 100. SAS is a connection-switched network standard designed for connecting high-capacity, relatively low-performance targets 102 to one or more initiators 104. The targets 102 may be high-capacity magnetic hard disk drives (HDDs). The initiator 104 may be a server CPU. SAS protocol may yield a relatively high delay, or latency, to establish a connection between the initiator 104 and the target 102. With SAS once a connection is established data can be transferred with a high bandwidth.

The SAS connection 100 is connection-switched and the latency of completing a SAS transaction is often limited by whether other connections are utilizing shared connection resources. If the SAS connection 100 has a single SAS expander 106 link between the SAS initiator 104 and the SAS expander 106 and a long transfer is in progress by the initiator 104, any other transaction, independent of size, waits until the blocking connection completes before transferring.

Since SAS has advantageous properties, such as being highly scalable and having robust cable and connector standards, it may be desirable to bridge the PCIe protocol (PCIe tunneling over SAS) so that it can be carried within SAS connections. There may be challenges with PCIe tunneling. Any single SAS connection is inherently limited by the bandwidth of a single serial link, whereas PCIe uses byte-striping to aggregate the bandwidth of multiple serial links for a single data transfer. For example, a 4-lane (×4) PCIe Gen-3 link can provide the equivalent bandwidth of 4 PCIe Gen-3 links, or 4×1=4 gigabytes per second transfers. A SAS-3 connection is only capable of providing the bandwidth of a single 12 Gbps SAS link, or 1.2 gigabytes per second. As a result, it would not be possible to carry the bandwidth of a multi-lane PCIe link over SAS connections without a significant reduction in performance.

As the latency performance of SAS protocol is inherently limited by connection blocking effects, a tunneled PCIe connection would be subjected to these limitations. As a result, PCIe latency performance through a tunneled connection over SAS may be reduced in the same way that SAS latency suffers from connection blocking effects.

Another approach to support the mixture of protocols is to translate SAS protocol into an alternate PCIe-based protocol standard such as small computer system interface (SCSI) express or non-volatile memory (NVM) express. While this approach has the benefit of adhering to strict standards, implementations may suffer from substantially increased cost and complexity due to the complex nature of protocol translation.

The present disclosure provides a system and a method that is intended to have at least one of the following features: a single, unified backbone interconnect (PCIe); does not have performance overhead for attached PCIe devices; supports carrying SAS traffic over the same unified (PCIe) interconnect; and is a lightweight and inexpensive bridging method.

Figure 2:
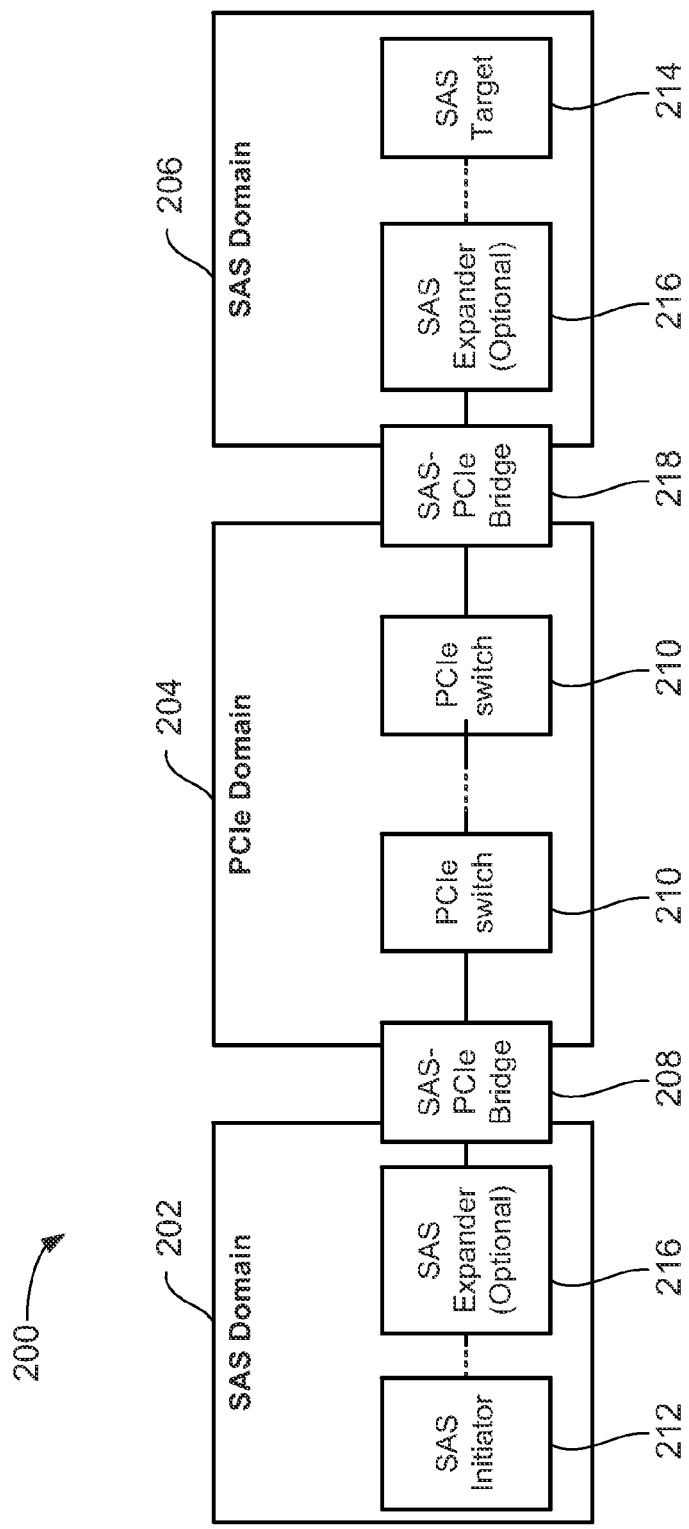
FIG. 2 is a SAS-PCIe transport system, in accordance with an embodiment.

FIG. 2 illustrates a SAS-over-PCIe bridging system 200, in accordance with an embodiment. The SAS-over-PCIe bridging system 200 connects a first SAS domain 202 having a SAS initiator 212 across a PCIe domain 204 to a second SAS domain 206 having a SAS target 214. A first SAS-PCIe bridge 208 encapsulates SAS protocol into PCIe transport layer packets (TLPs) and a complementary second SAS-PCIe bridge 218 converts the TLPs back into SAS protocol. In this embodiment, at least two SAS-PCIe bridges 208, 218 and two PCIe switches 210 are used: one on each side of the PCIe domain 204 where connections to SAS domain devices 212, 214 are desired. The SAS over PCIe bridging system 200 optionally has SAS expanders 216.

Figure 3:
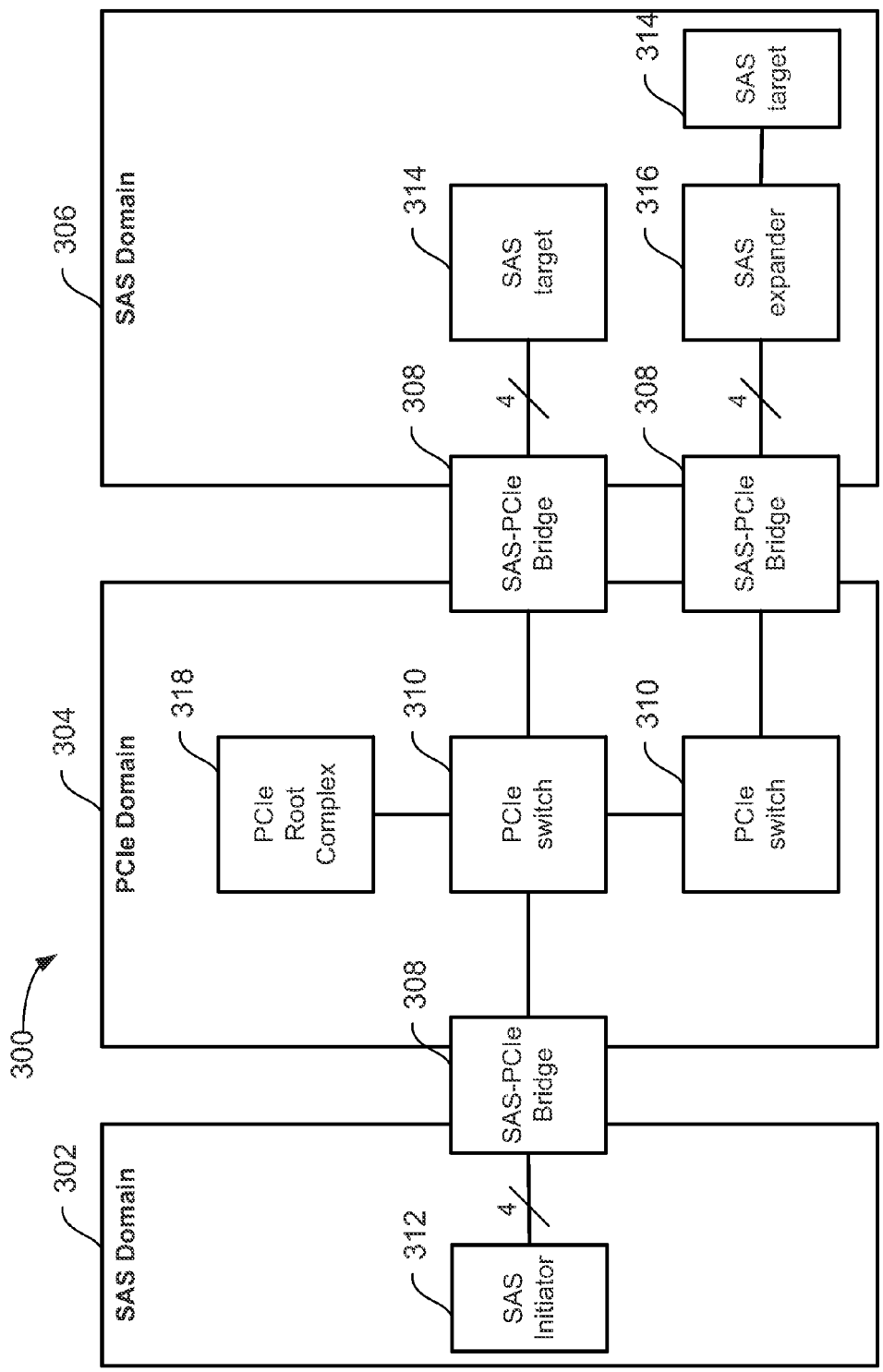
FIG. 3 is a SAS-PCIe transport system having multiple SAS-PCIe bridges, in accordance with an embodiment.

FIG. 3 illustrates a SAS discovery system 300, in accordance with an embodiment. The SAS discovery system 300 connects a first SAS domain 302 having a SAS initiator 312 across PCIe domain 304 to a second SAS domain 306 having SAS targets 314. The SAS discovery system 300 has SAS-PCIe bridges 308 at interfaces between the S SAS domains 302, 306 and the PCIe domain 304. The SAS-PCIe bridge 308 presents itself to the SAS domains 302, 306 as a SAS expander with a number (N) of SAS ports, where N is the number of SAS-PCIe interface points. For example, FIG. 3 illustrates three SAS-PCIe bridges 308 in the PCIe domain 304. The PCIe domain 304 has PCIe switches 310 and a PCIe root complex 318 (described in further detail with reference to FIG. 21). The SAS domain 306 may have a SAS expander 316 that functions as such.

Figure 4:
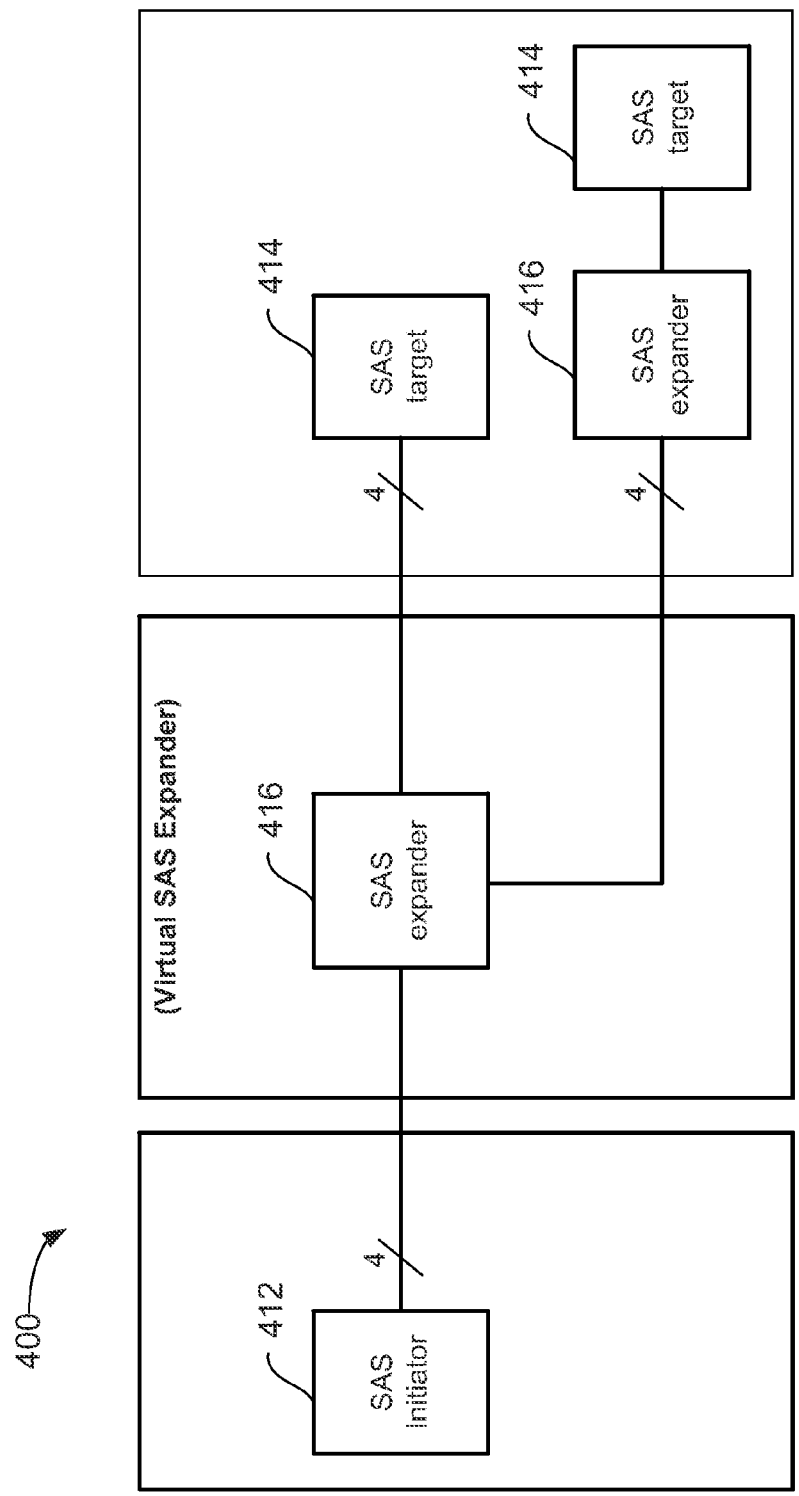
FIG. 4 is a SAS-PCIe transport system showing SAS discovery through the SAS-PCIe bridges, in accordance with an embodiment.

FIG. 4 is a logical representation of a version of FIG. 3 and illustrates a SAS discovery through SAS-PCIe bridge system 400, in accordance with an embodiment. SAS initiator 412 and SAS targets 414 see only SAS expanders 416.

Figure 5:
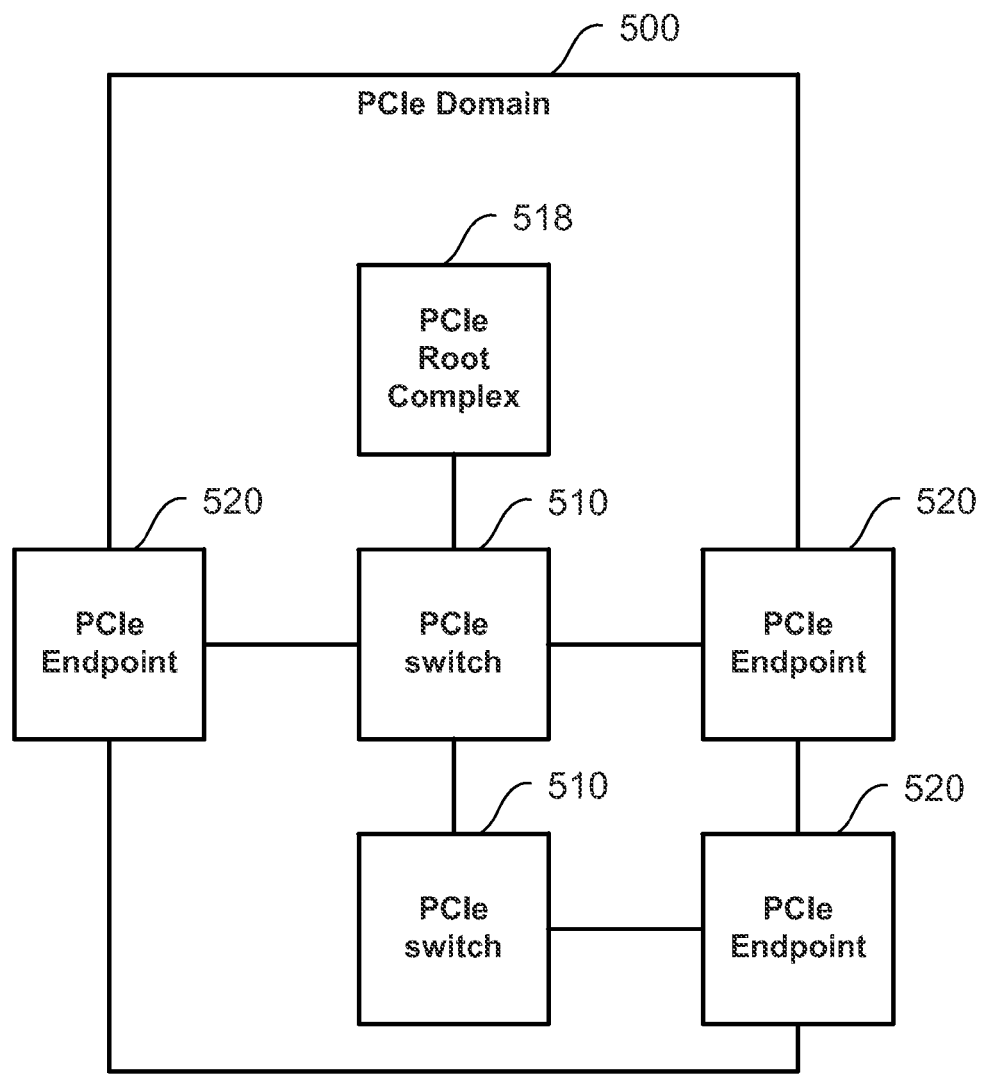
FIG. 5 is a PCIe domain, in accordance with an embodiment.

FIG. 5 illustrates a PCIe enumeration model of a PCIe domain 500. The PCIe domain 500 includes PCIe switches 510 and a PCIe root complex 518. Bridges of the PCIe domain 500 are implemented as PCIe endpoints 520. The SAS-PCIe bridges 208, 218, 308 (of FIGS. 2 and 3) appear as PCIe endpoints 520 to the PCIe domain 500. The PCIe endpoints 520 are part of the SAS-PCIe bridges 208, 218, 308. The PCIe endpoints 520 may behave in different ways to compose PCIe packets, as described with reference to FIGS. 8, 9, and 15.

Figure 6:
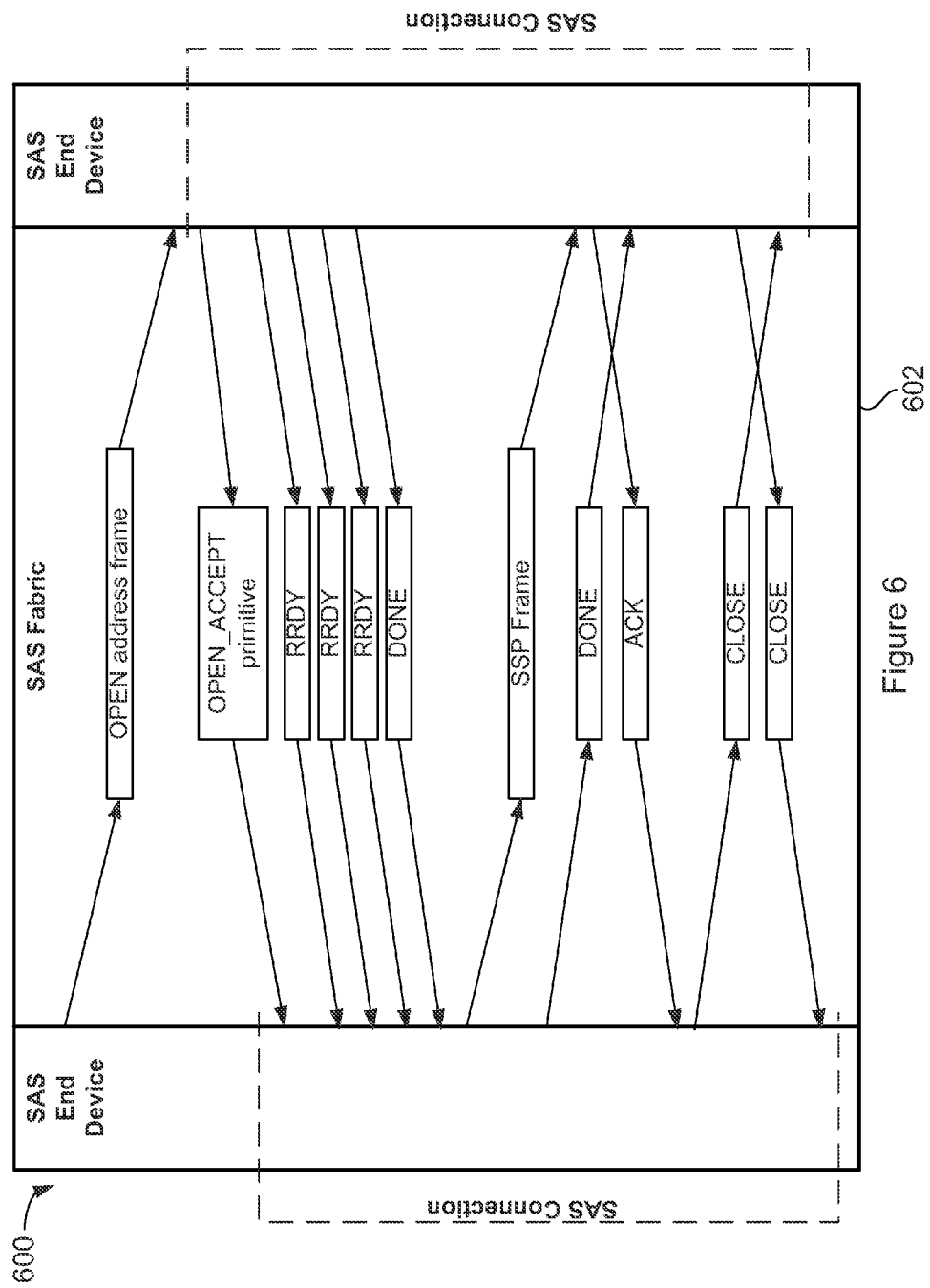
FIG. 6 is an example SAS protocol dataflow.

FIG. 6 illustrates a SAS protocol stream 600 for a SAS connection 602. The mapping of SAS frames follows the SAS protocol as defined in SAS standard specifications, as is known in the art.

As SAS protocol is inherently incompatible for transmission through PCIe switches, a SAS-PCIe bridge according to an embodiment encapsulates SAS protocol into PCIe TLPs. It will be understood that mapping of SAS frames and primitives into a PCIe TLPs may be done in a variety of ways.

Figure 7:
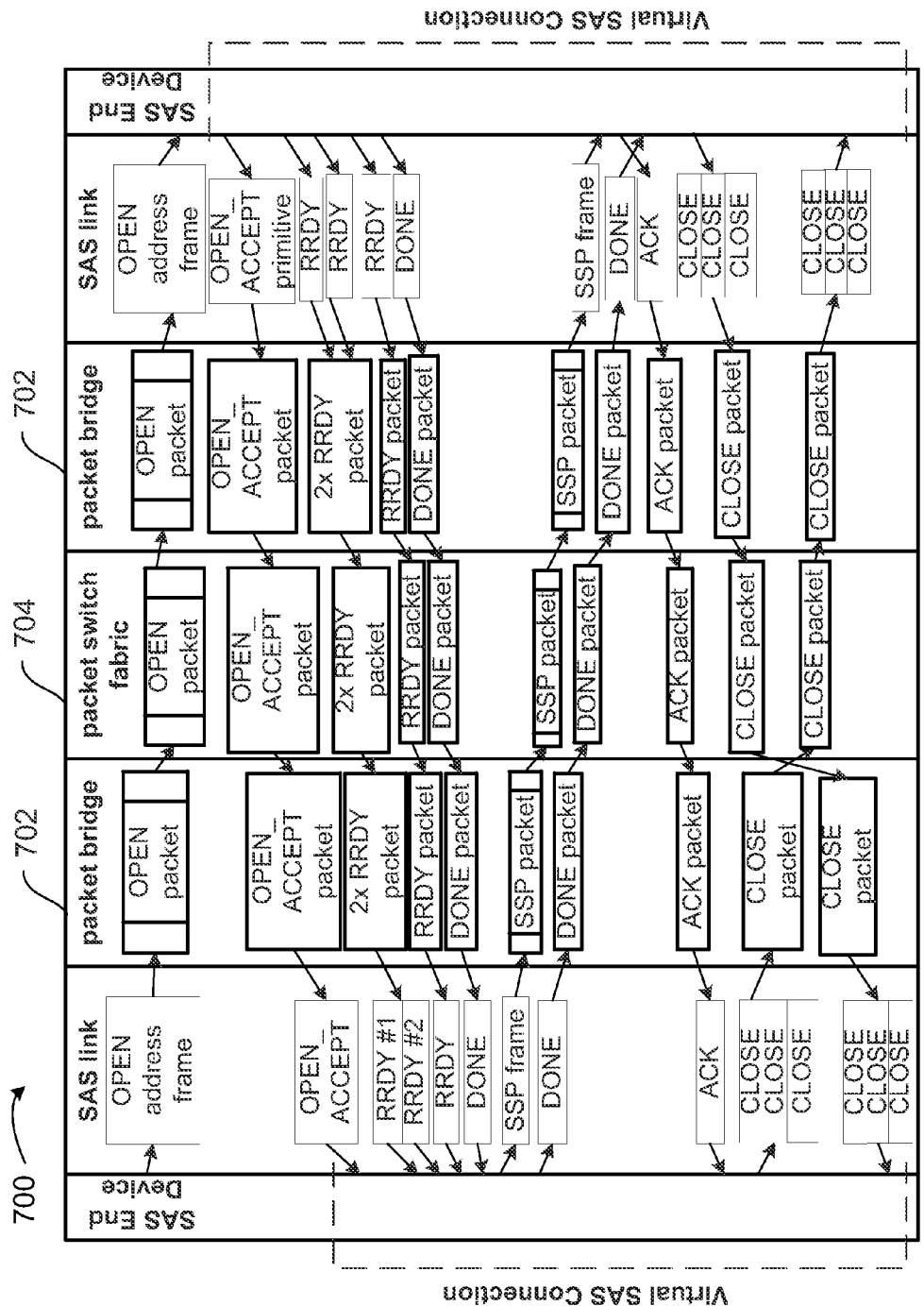
FIG. 7 is an example SAS across PCIE dataflow, in accordance with an embodiment.

FIG. 7 illustrates SAS over PCIe data stream 700, in accordance with an embodiment. A SAS-PCIe bridge 702 receives SAS frames and primitive sequences and encapsulates them into PCIe TLPs for transmission through PCIe switch fabric 704. Similarly, PCIe TLPs that designate SAS frames and primitive sequences are received by the PCIe-side of the SAS-PCIe bridge 702. The SAS-PCIe bridge 702 converts the PCIe TLPs back into native SAS frames and primitive sequences.

The PCIe TLPs move as packets through the PCIe switch fabric 704. A virtual SAS connection exists between PCIe endpoints for a portion of time coincident with the SAS connection states in the SAS devices attached through the SAS-PCIe bridges 702.

In a first embodiment, PCIe packets representing encapsulated SAS protocol use special protocol multiplexing packets encoded using the PCIe protocol multiplexing extensions (e.g, PCIe 3.0). In a second embodiment, PCIe packets representing encapsulated SAS protocol use standard memory write request TLPs transferred between non-transparent bridges. In a third embodiment, PCIe packets representing encapsulated SAS protocol use proprietary packets.

Figure 8:
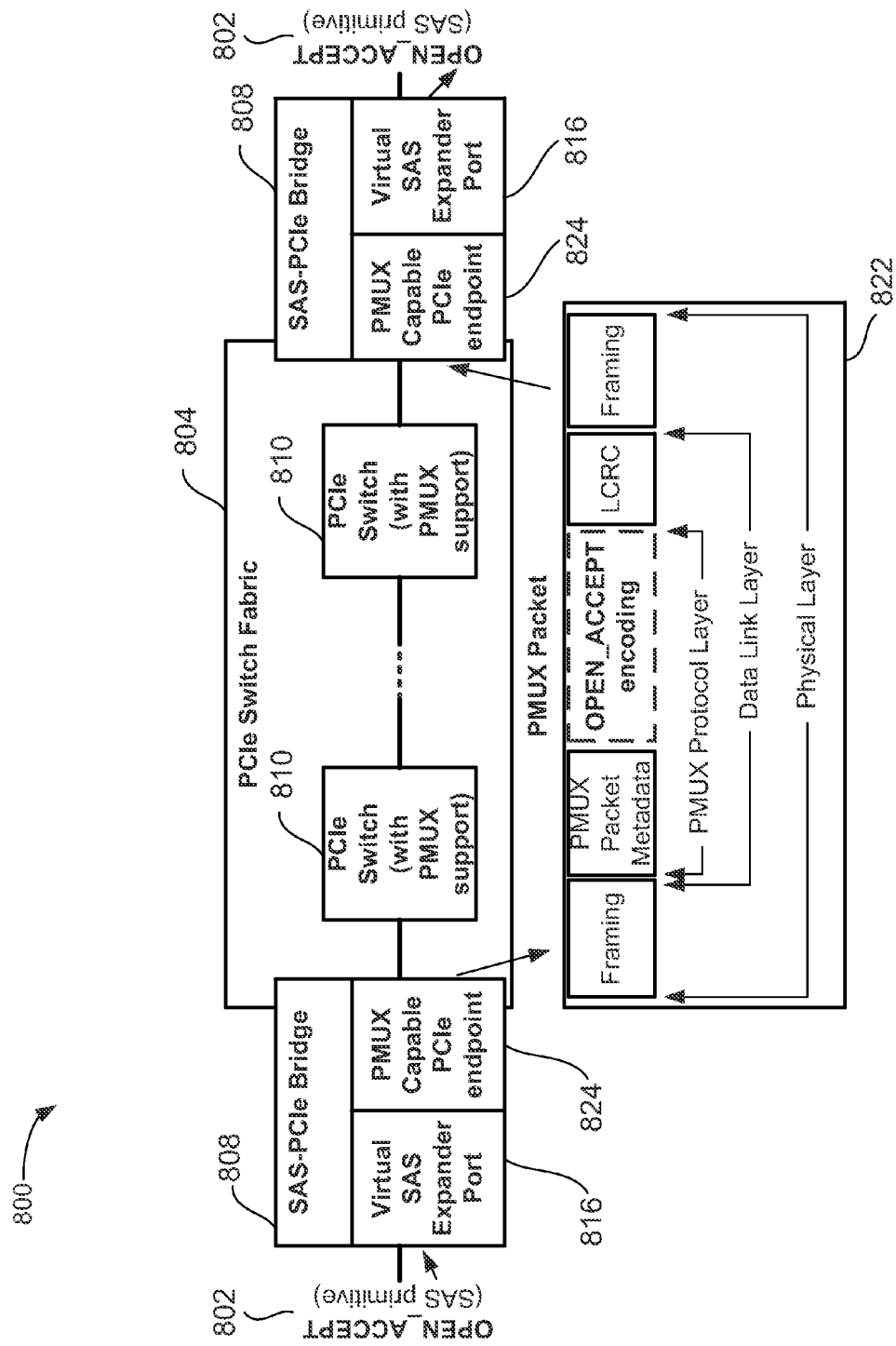
FIG. 8 is a system of transferring SAS protocol across PCIe using protocol multiplexing (PMUX), in accordance with an embodiment.

FIG. 8 illustrates a system 800 for protocol multiplexing (PMUX) SAS traffic to PCIe switch fabric 804, in accordance with an embodiment. PMUX packets 822 are encoded using the PCIe PMUX extensions. The PMUX packets pass to PCIe switches 810 that support the PCIe PMUX protocol. PMUX is a set of extensions adopted for PCIe to support running non-PCIe protocols through PCIe switch fabric 804.

PCIe protocol multiplexing may not use PCIe replay mechanisms when a packet is corrupted on a PCIe link 804. With the PMUX system 800, data integrity is expected to be guaranteed by higher protocol layers. Thus, if encapsulated SAS data is classified as PMUX traffic, the SAS-PCIe bridges 808 use additional methods to guarantee end-to-end data integrity, such as end-to-end frame sequence numbers, timeouts and retransmission requests. The PMUX system 800 may add to the complexity of the SAS-PCIe bridge 808. The PMUX system 800 may also rely on the existence of PCIe switches 810 that support this relatively new protocol extension.

The SAS-PCIe bridge 808 includes a SAS component, such as a virtual SAS expander port 816 and a PCIe component, such as a PMUX capable PCIe endpoint 824. The PMUX capable PCIe endpoints 824 send PMUX packets 822 between each other. The PMUX packets 822 contain a data structure describing SAS primitives or frames 802 that are regenerated at the other PMUX-capable endpoint 824.

Figure 9:
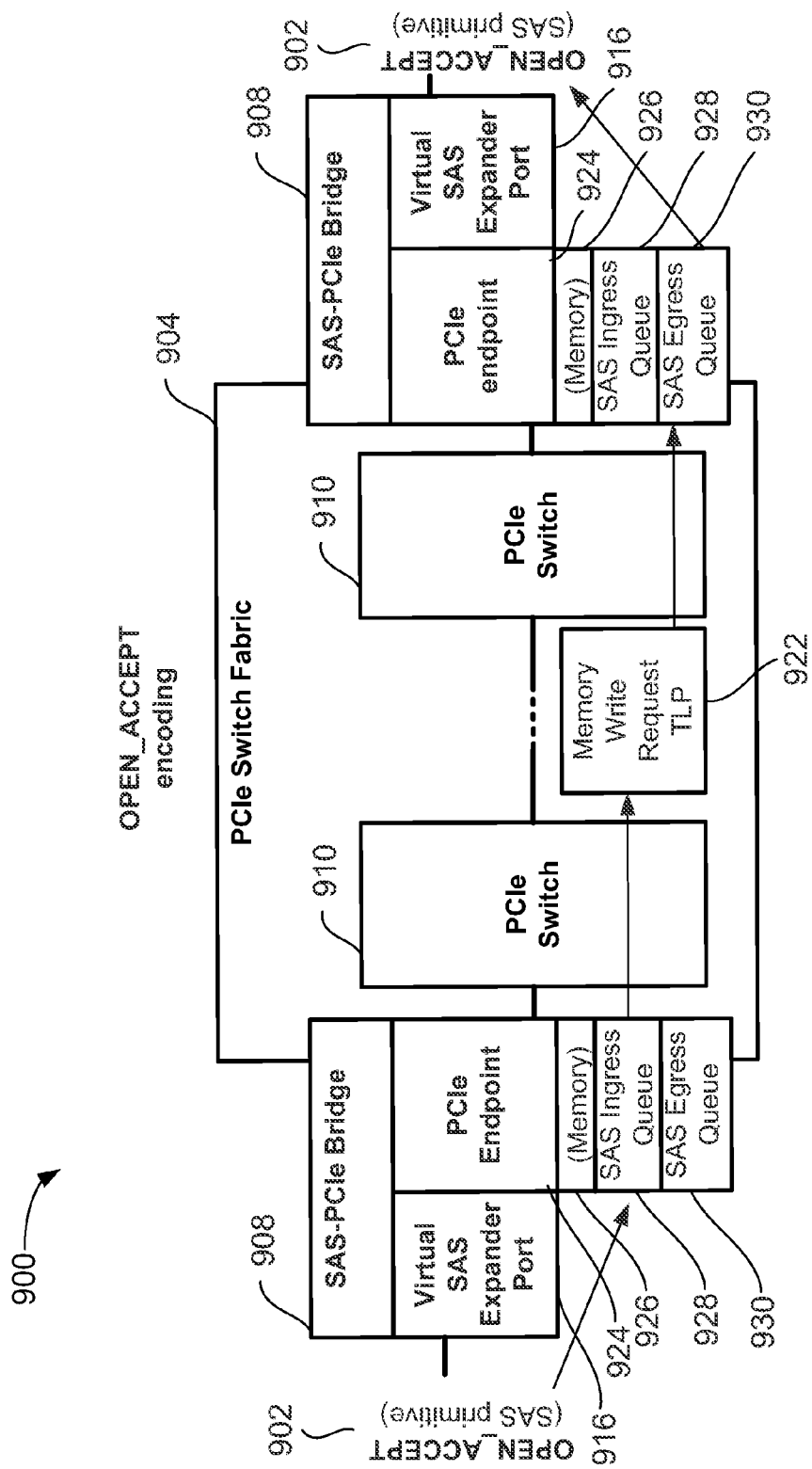
FIG. 9 is a system of transferring SAS protocol across PCIe using memory-mapped communication, in accordance with an embodiment.

FIG. 9 illustrates a memory-mapped protocol encapsulation system 900, in accordance with an embodiment. Memory-mapped communication is performed over a PCIe switch fabric 904 between SAS-PCIe bridges 908. Standard memory write request TLPs 922 are transferred between non-transparent SAS-PCIe bridges 908 and are supported by currently available PCIe switches 910. The protocol encapsulation system 900 includes SAS-PCIe bridges 908 operating as a pair of PCIe endpoints 924 and as SAS expanders 918. Each SAS-PCIe bridge 908 uses memory write request TLPs 922 to write data structures describing SAS primitives 902 and frames into a memory space 924 of the other SAS-PCIe bridge 908. The delivery of this data structure triggers the regeneration of the SAS frames and primitive sequences on the SAS side of the partner bridge 908. The SAS-PCIe bridge 908 includes a PCIe component, such as the PCIe endpoint 924, a SAS component, such as a virtual SAS expander port 916, the memory space 926, a SAS ingress queue 928, and a SAS egress queue 930.

The SAS link layer protocol is encapsulated within PCIe memory read/write TLPs 922. Specifically the exact address frames and primitives associated with setting up and tearing down end-to-end connections as well as the SAS link layer frames are encapsulated within the memory read/write TLPs 922.

Figure 10:
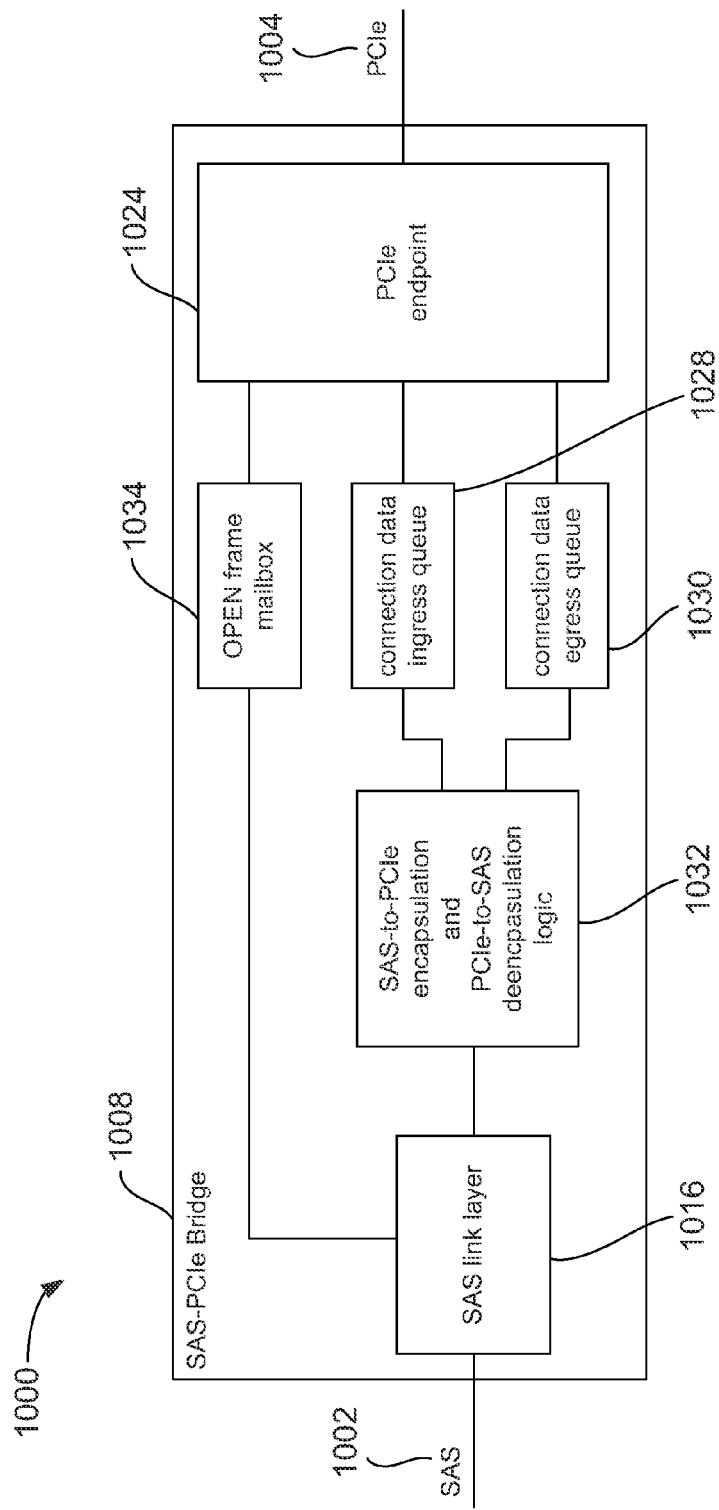
FIG. 10 is a SAS-PCIe bridge for the system of FIG. 9, in accordance with an embodiment.

FIG. 10 illustrates a system 1000 for communication between a SAS protocol 1002 and PCIe protocol 1004 across a SAS-PCIe bridge 1008, in accordance with an embodiment. The system 1000 may be used in the memory-mapped protocol encapsulation system 900 of FIG. 9. The SAS-PCIe bridge 1008 has a route table 1036 that binds each SAS-PCIe bridge 1008 to range of phys in the virtual expander. The SAS-PCIe bridge 1008 includes a SAS link layer 1016, SAS-to-PCIe encapsulation and de-encapsulation logic 1032, an OPEN frame mailbox 1034, a connection data ingress queue 1028, a connection data egress queue 1030, and a PCIe endpoint 1024.

Figure 11:
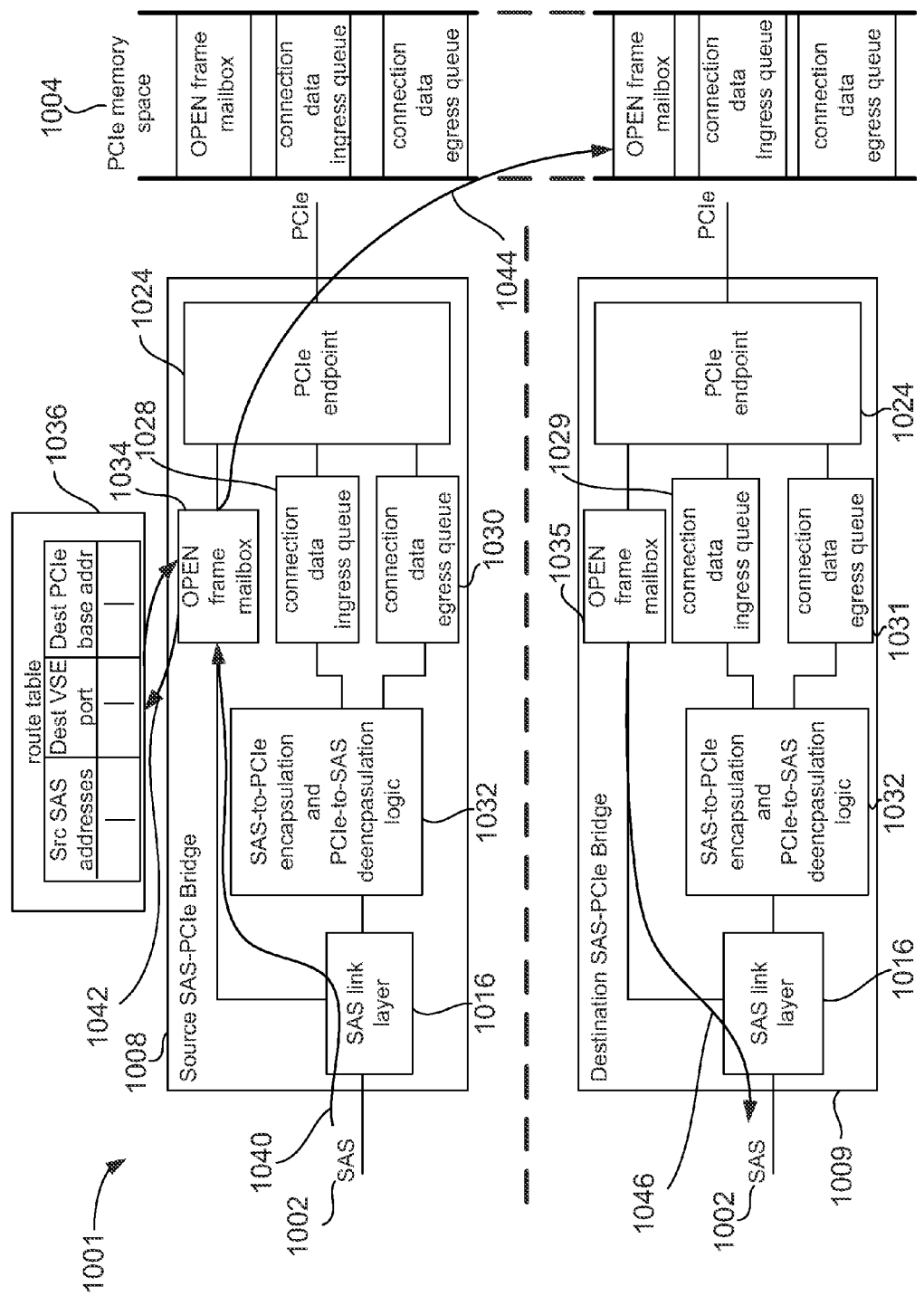
FIGS. 11, 12, 13 illustrate a flow of data across the SAS-PCIe bridge of FIG. 10, in accordance with an embodiment.
Figure 12:
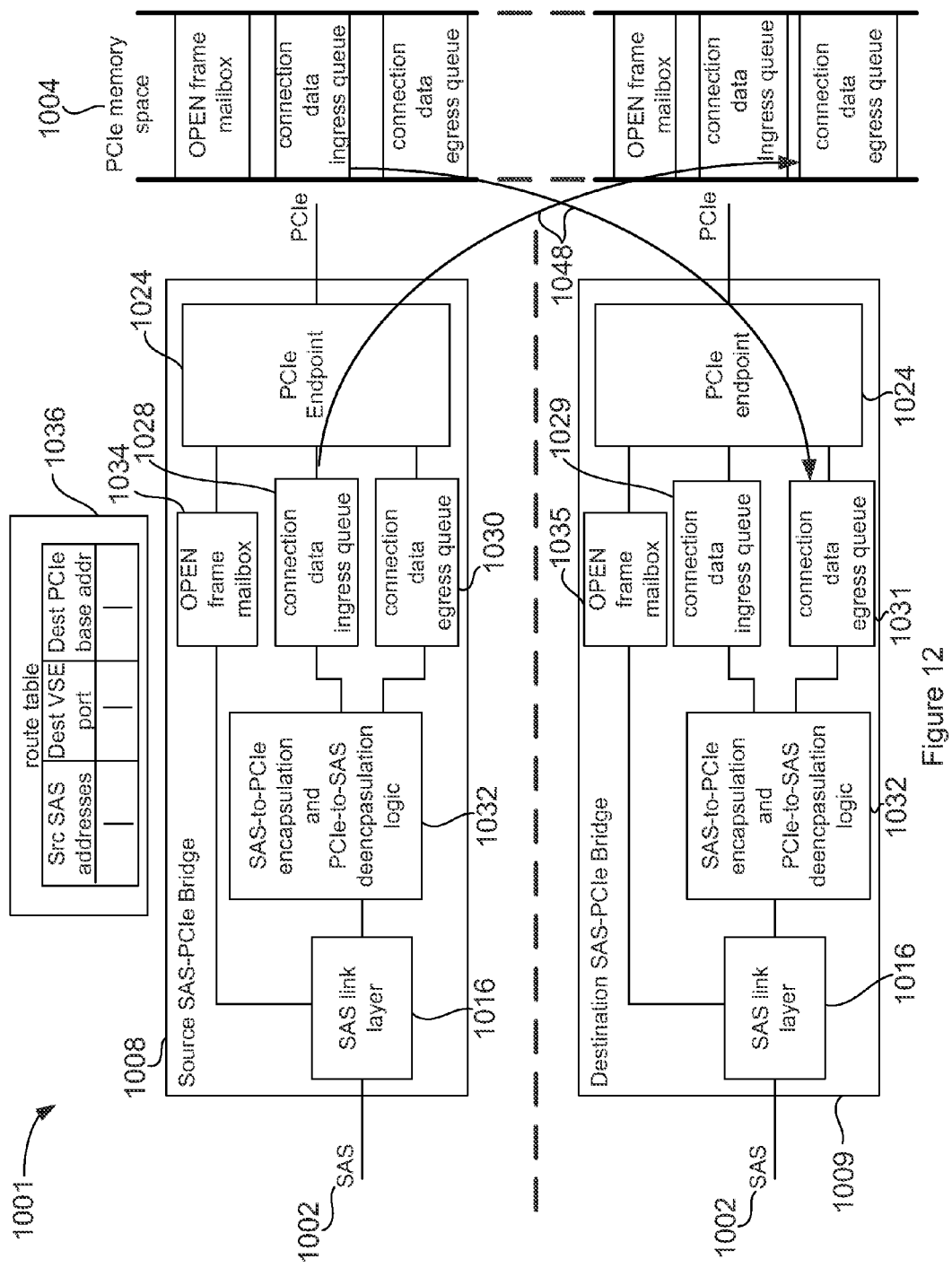
Figure 13:
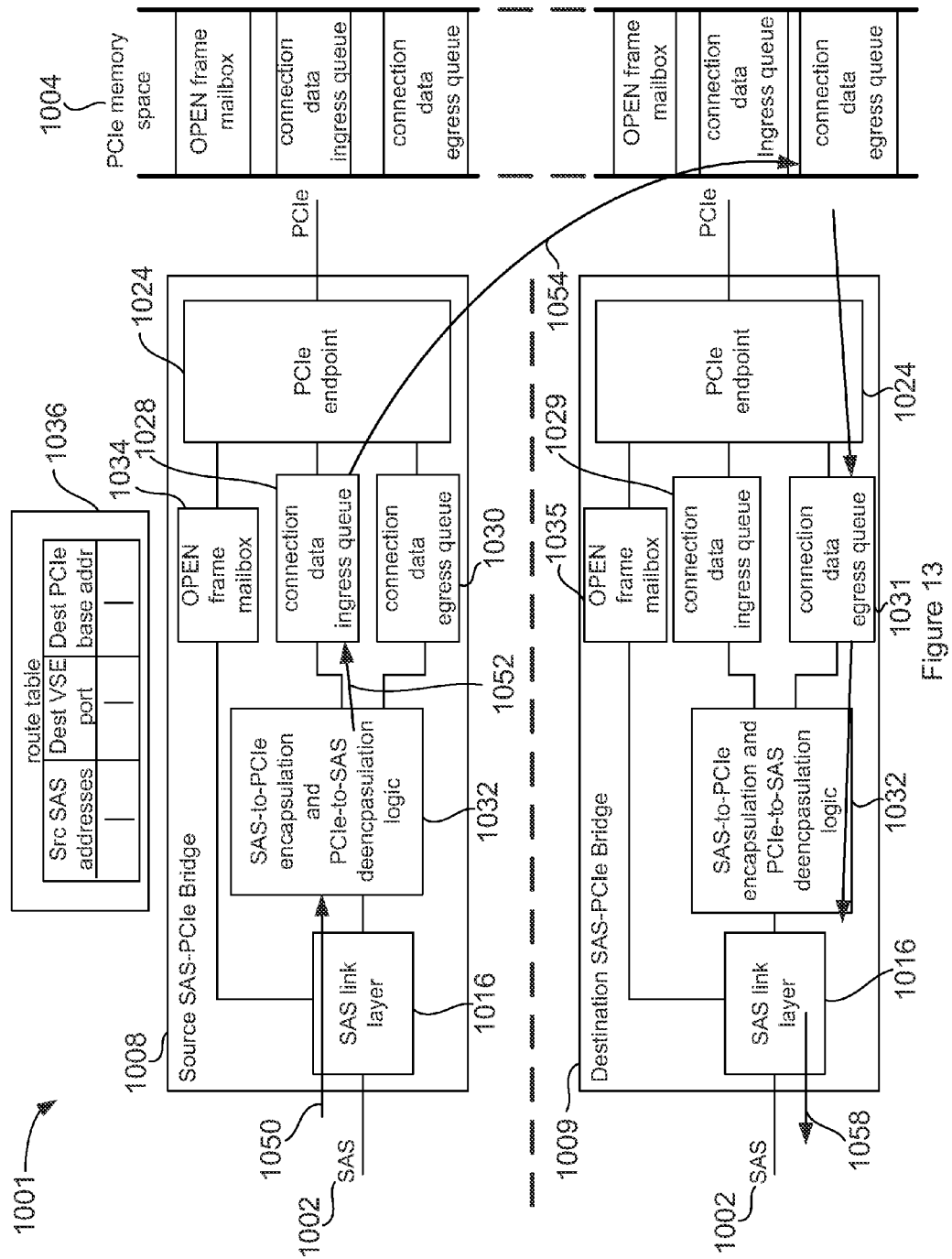

FIGS. 11, 12, and 13 illustrate a flow of data 1001 from the source SAS-PCIe bridge 1008 to a destination SAS-PCIe bridge 1009. A SAS OPEN address frame is received, at 1040, by a SAS phy on the source SAS-PCIe bridge 1008. The source SAS-PCIe bridge 1008 looks up, at 1042, the OPEN frame destination address in the route table 1036 to determine the destination port within the virtual SAS expander where the OPEN frame should be routed. The source SAS-PCIe bridge 1008 looks up, at 1042, the PCIe memory address of a OPEN frame mailbox 1035 in the destination SAS-PCIe bridge 1009 that is associated with that destination port, and subsequently uses PCIe memory write request TLPs (e.g. memory write request TLPs 922 of FIG. 9) to write, at 1044, the OPEN frame contents into the OPEN frame mailbox 1035 in the destination SAS-PCIe bridge 1009 associated with that destination port. The source SAS-PCIe bridge 1008 also writes the memory address of the ingress/egress queue 1028, 1030 in the source SAS-PCIe bridge 1008 into a control register at the destination SAS-PCIe bridge 1009. The destination SAS-PCIe bridge 1009 will eventually use the address of the source ingress/egress queue 1028, 1030 to establish a binding between the virtual SAS expander phys in both the source and destination SAS-PCIe bridges 1008, 1009.

Once the OPEN frame contents have been delivered to the OPEN frame mailbox 1035 in the destination SAS-PCIe bridge 1009, the destination port logic arbitrates for a connection path between locally inbound OPEN frames received by the SAS phys and locally outbound OPEN frames received in the OPEN frame egress queue. Rules for this arbitration would generally follow the rules defined in the SAS standard for OPEN frame arbitration.

At the destination SAS-PCIe bridge 1009, when the outbound OPEN frame wins arbitration a phy is selected in the virtual SAS expander port to route the OPEN frame, and the destination SAS-PCIe bridge 1009 transmits, at 1046, the OPEN frame contents on the SAS phy. The destination SAS-PCIe bridge 1009 then binds, at 1048 (of FIG. 12), a destination ingress/egress queue pair 1029, 1031 with the ingress/egress queue pair 1028, 1030 at the source SAS-PCIe bridge 1008, using the memory address of the ingress/egress queue pair 1028, 1030 in the source SAS-PCIe bridge 1008 that originally received the OPEN frame. A bidirectional binding is established between the two SAS phys that are in separate SAS-PCIe bridges 1008, 1009 in the virtual SAS expander.

After the binding is established between the virtual SAS expander source phy and destination phy, SAS primitives and frames received, at 1050 (of FIG. 13), by the virtual SAS expander phys are encapsulated into a data descriptor, at 1052, in the source ingress queue 1028. These descriptors in the ingress queue 1028 induce, at 1054, memory write request TLPs to the egress queue 1031 in the destination virtual SAS expander phy. Logic 1032 in the destination SAS-PCIe bridge 1009 de-encapsulates the descriptors, at 1056. The descriptors are sent, at 1058, back into the equivalent SAS frame or primitive to be transmitted on the virtual SAS expander phy.

It will be understood that there are a number of ways that a SAS-PCIe encapsulation scheme would work. In the embodiment of FIG. 13, SAS data is received, at 1050, and encapsulated, at 1052, into a descriptor. The descriptor is placed into the ingress queue 1028 on the source SAS-PCIe bridge 1008. Descriptors in the ingress queue 1028 are transferred, at 1054, by the PCIe endpoint 1024 to the destination egress queue 1031 using memory write TLPs. The descriptors that arrive at the destination egress queue 1031 are translated back, at 1056, into the respective SAS primitives and frames. The SAS data is transmitted, at 1058, on the SAS link 1002.

Figure 14:
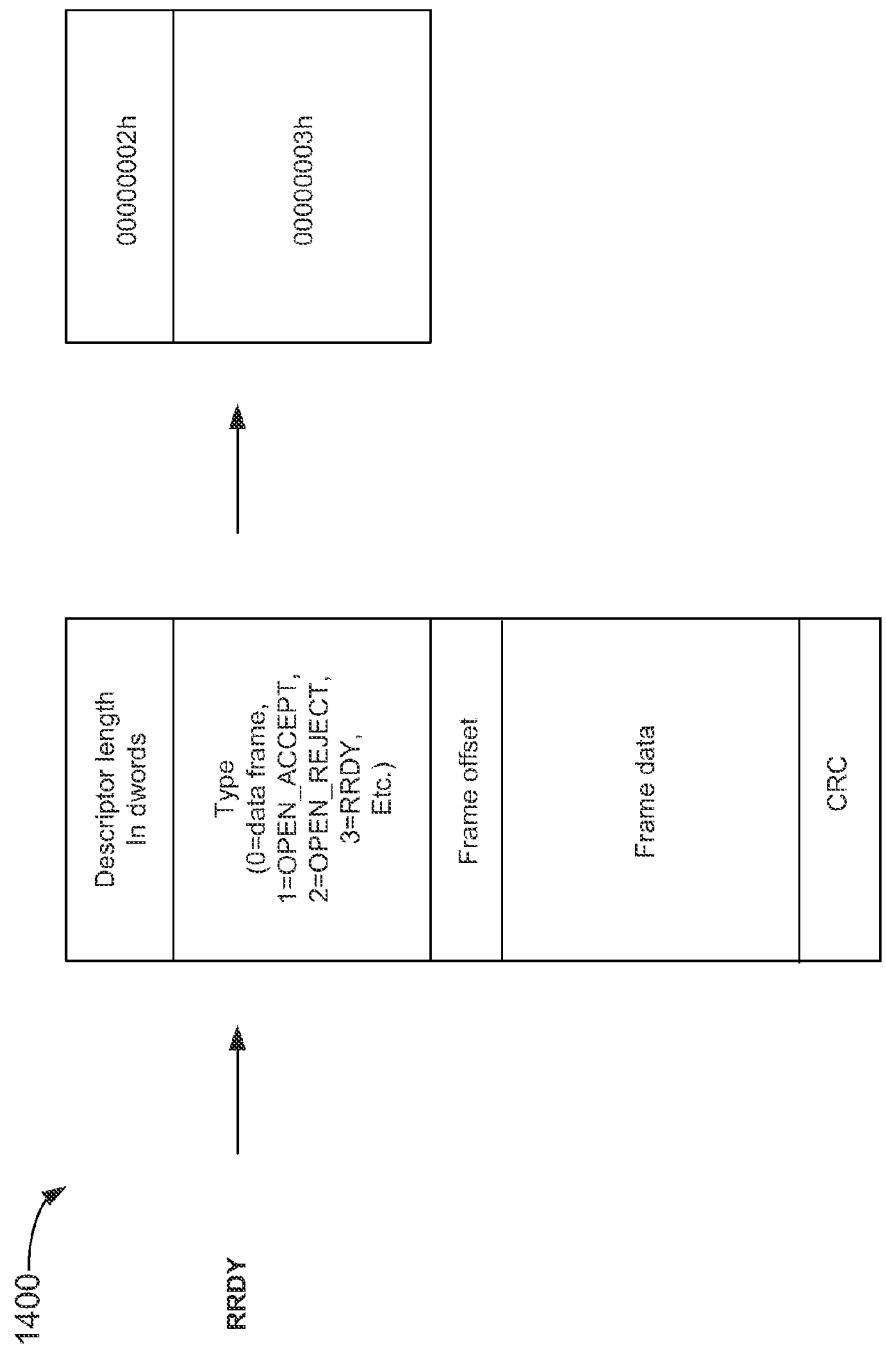
FIG. 14 is a descriptor 1400 that represents an RRDY, in accordance with an embodiment.

FIG. 14 illustrates a descriptor 1400 that represents an RRDY, in accordance with an embodiment. The same descriptor format may be used to represent other SAS primitives as well as frame data.

Figure 15:
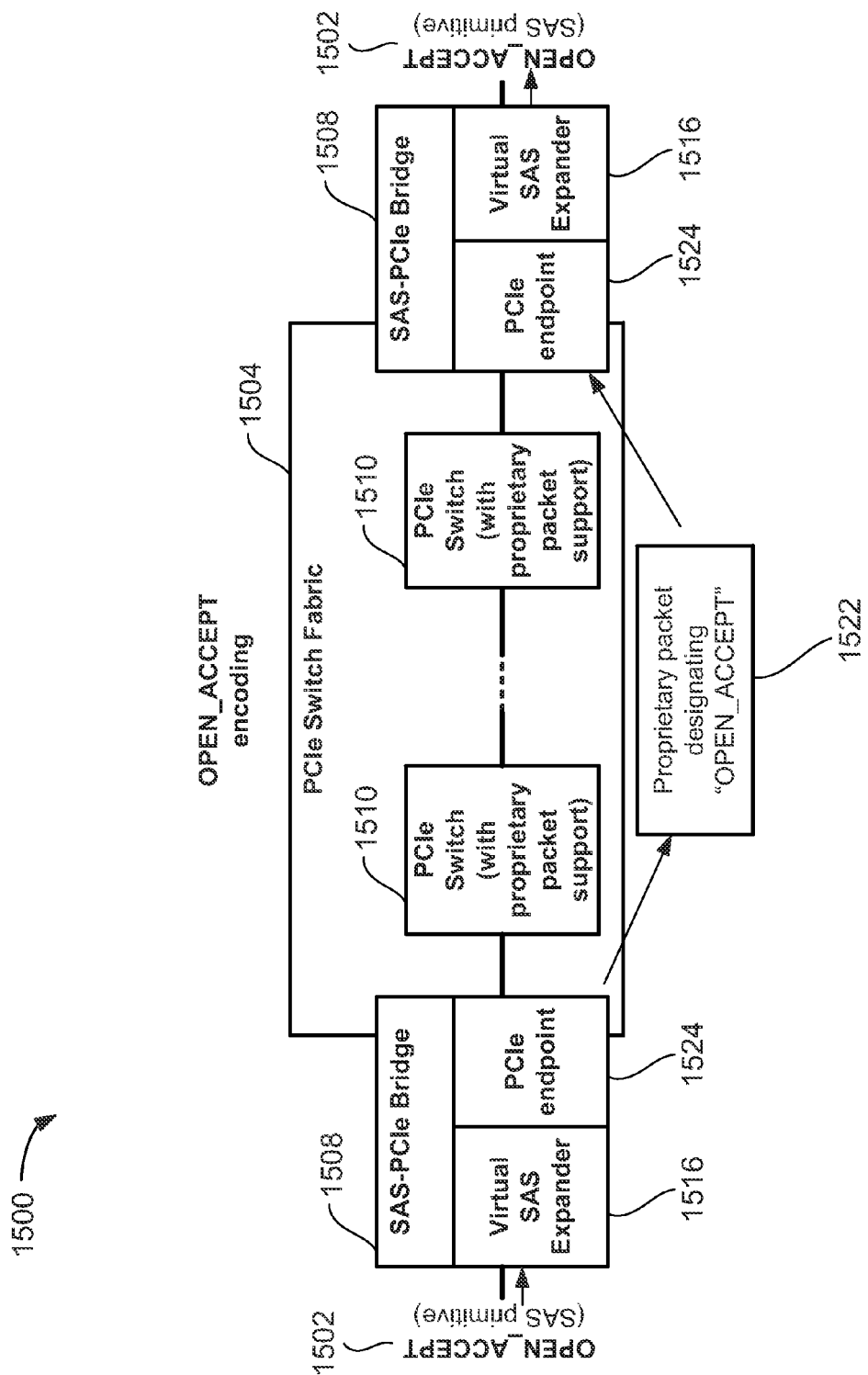
FIG. 15 is a system of transferring SAS protocol across PCIe using proprietary packets, in accordance with an embodiment.

FIG. 15 illustrates using a system 1500 for carrying SAS traffic over PCIe switch fabric 1504 using proprietary PCIe packets 1522, in accordance with an embodiment. The proprietary PCIe packets 1522 are sent to special purpose PCIe switches 1510 that are capable of routing the proprietary PCIe packets 1522 between SAS-PCIe bridges 1508. The SAS-PCIe bridge 1508 on the left of FIG. 15 generates proprietary PCIe packets 1522 addressed for the other SAS-PCIe bridge 1508 on the right of FIG. 15. The PCIe switches 1510 support transporting the proprietary PCIe packets 1522. In this model, the SAS-PCIe bridges 1508 appear as PCIe components (e.g. PCIe endpoints) 1524 but would have the ability to generate the proprietary PCIe packets 1522 that represent SAS primitives and frames 1502. PCIe switches 1510 route the proprietary PCIe packets 1522 to the PCIe endpoint 1524 to the PCIe switches 1510 where the proprietary PCIe packets 1522 are interpreted for regenerating the designated SAS primitives 1502 and frames on a SAS component side (e.g. virtual SAS expander side) 1516 of the receiving SAS-PCIe bridge 1508.

Figure 16:
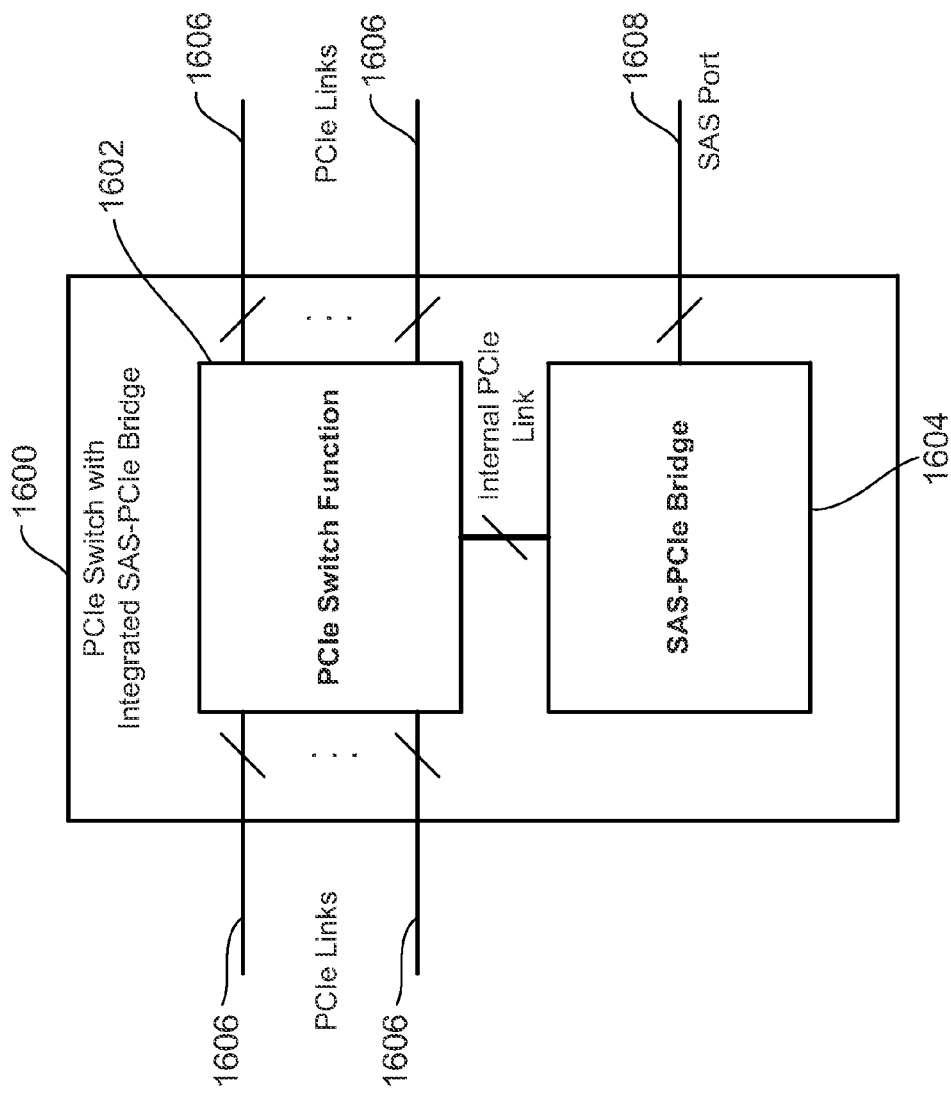
FIG. 16 is a PCIe switch with an integrated SAS-PCIe bridge, in accordance with an embodiment.

FIG. 16 illustrates an integrated PCIe device 1600 integrating a PCIe switch 1602 and a SAS-PCIe bridge 1602, in accordance with an embodiment. The SAS-PCIe bridge 1604 encapsulates SAS protocol for transmission over PCIe links 1606. The integrated PCIe device 1600 includes ports 1606 for connecting to external SAS devices. The integrated PCIe device 1600 may be a stand-alone integrated circuit (IC) product, or a functional block within a larger IC product.

Figure 17:
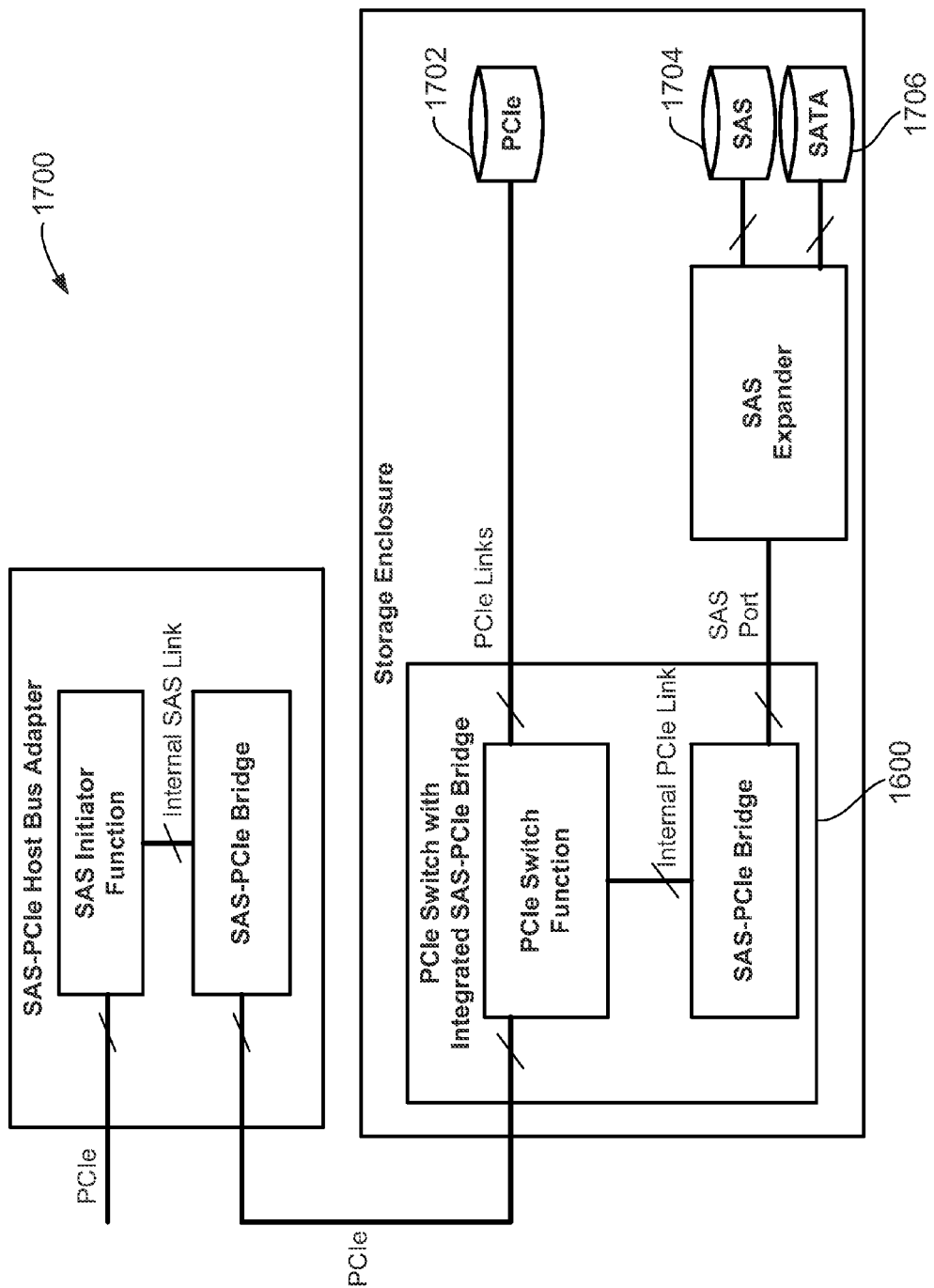
FIG. 17 is a system including the PCIe switch of FIG. 16, in accordance with an embodiment.

FIG. 17 illustrates a storage system 1700, in accordance with an embodiment. The storage system 1700 includes the integrated PCIe device 1600 of FIG. 16. The storage system 1700 includes any one or more of a PCIe storage device 1702, a SAS storage device 1704, and a SATA storage device 1706.

Figure 18:
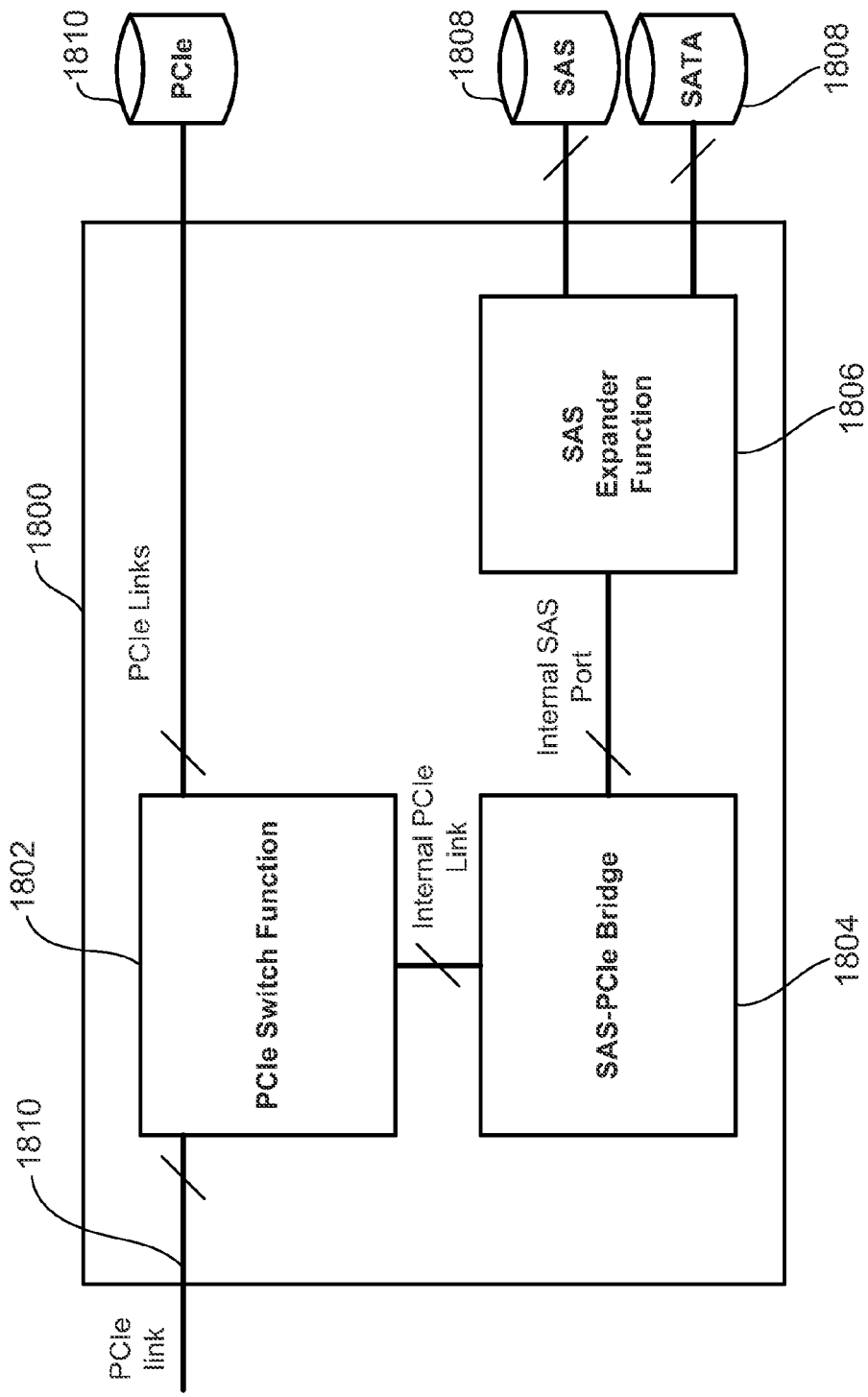
FIG. 18 is a PCIe switch with an integrated SAS-PCIe bridge and SAS expander, in accordance with an embodiment.

FIG. 18 illustrates an integrated PCIe device 1800, in accordance with an embodiment. The integrated PCIe device 1800 integrates a PCIe switch 1802, a SAS-PCIe bridge 1804, and a SAS expander 1806. The integrated PCIe device 1800 bridges traffic between at least one SAS domain 1808 and a PCIe domain 1810.

Figure 19:
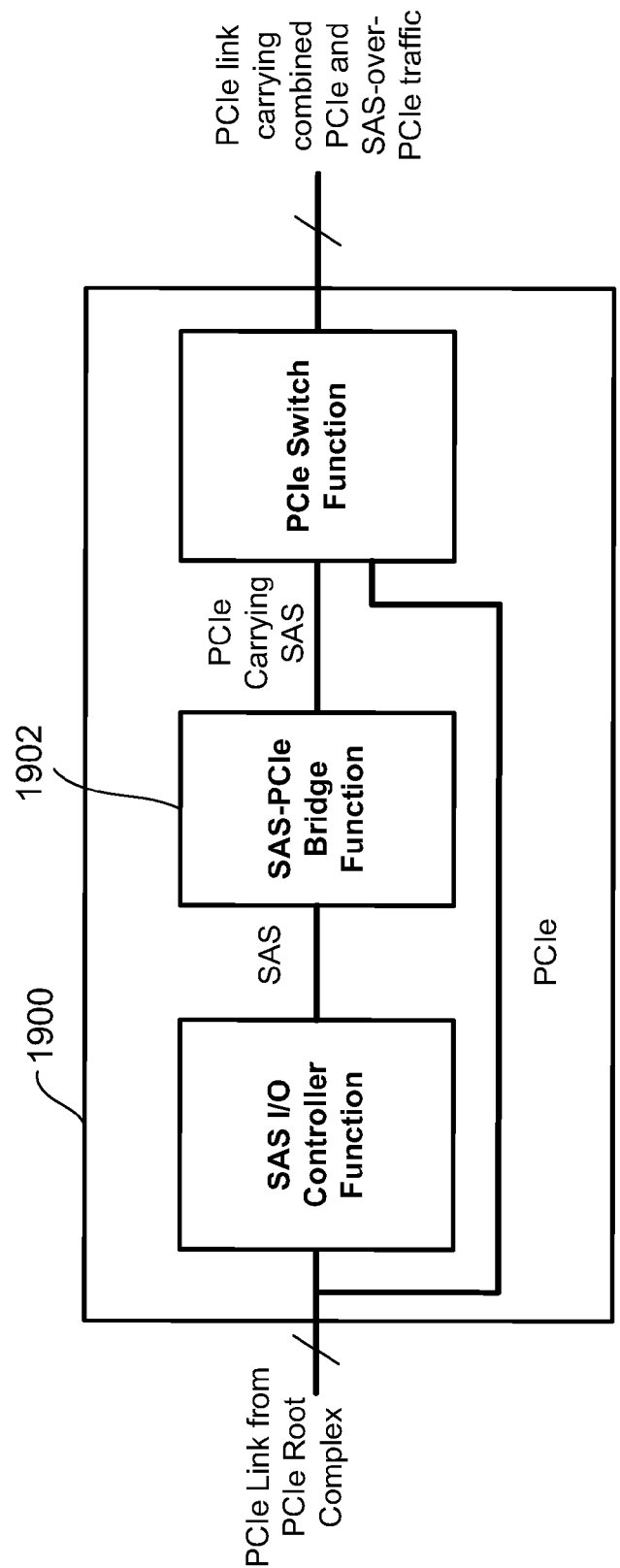
FIG. 19 is an input/output (I/O) controller with an integrated SAS-PCIe bridge, in accordance with an embodiment.

FIG. 19 illustrates an input/output (I/O) controller 1900, in accordance with an embodiment. The I/O controller 1900 may be, for example, a SCSI express, NVM express, and/or a SAS initiator. The I/O controller 1900 includes a SAS-PCIe bridge 1902 for generating encapsulated SAS traffic in a PCIe domain.

Figure 20:
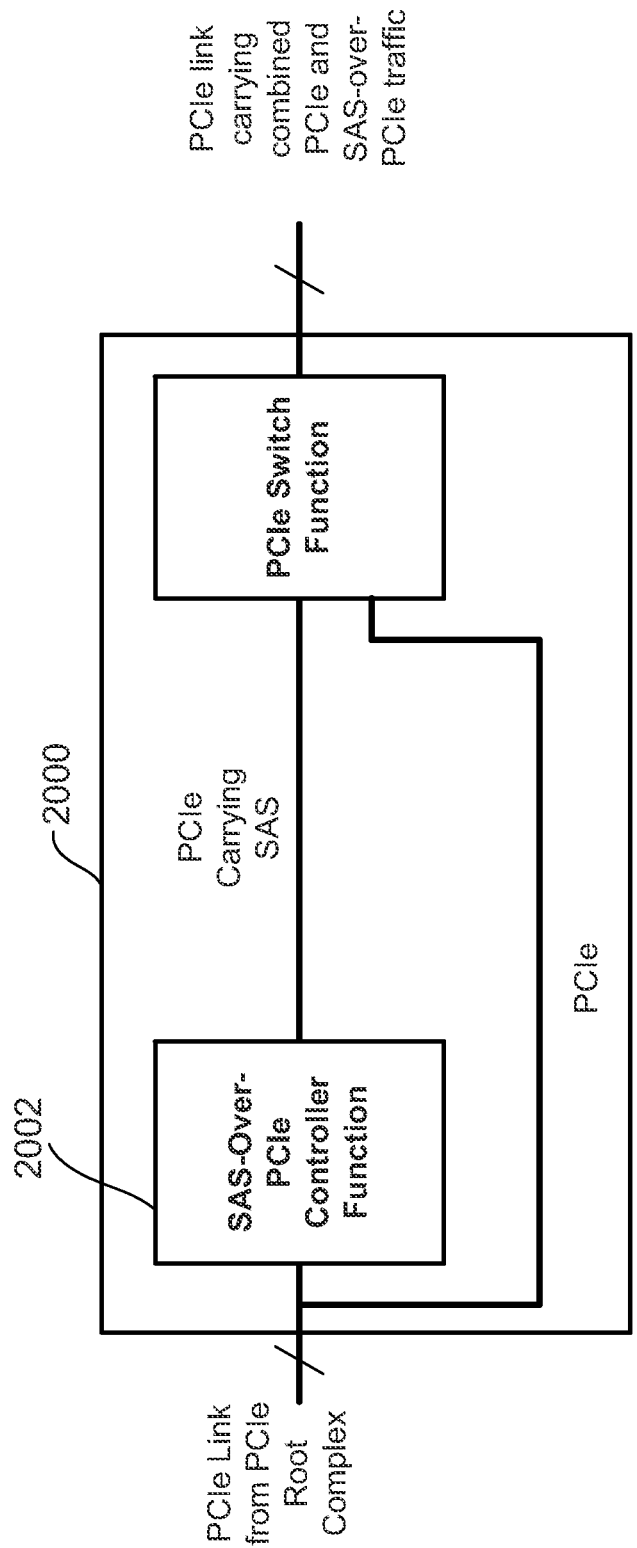
FIG. 20 is an I/O controller with a native SAS-over-PCIe protocol controller, in accordance with an embodiment.

FIG. 20 illustrates an I/O controller 2000 including a native SAS-over-PCIe protocol controller 2002, in accordance with an embodiment. The I/O controller 2000 natively generates encapsulated SAS traffic in a PCIe domain such that no native SAS initiator function is needed. The I/O controller 2000 may be analogous to a native STP initiator in SAS, rather than a SATA host connected through a SATA/STP bridge.

Figure 21:
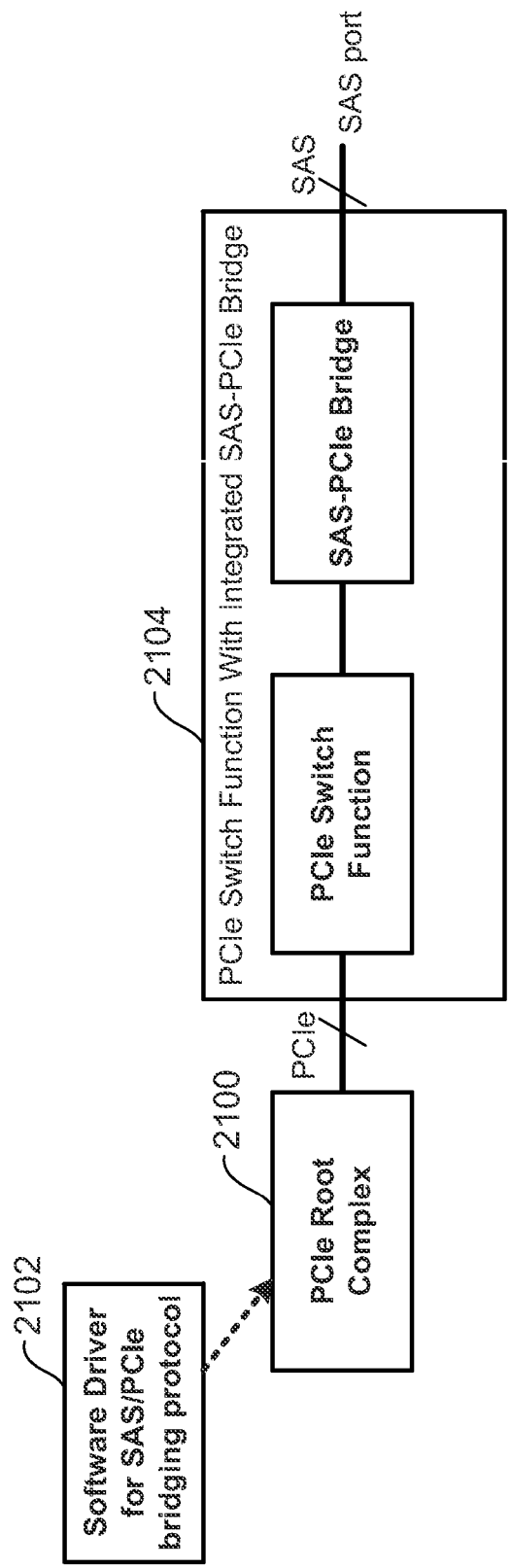
FIG. 21 is a PCIe root complex, in accordance with an embodiment.

FIG. 21 illustrates a PCIe root complex 2100 and a software driver 2102, in accordance with an embodiment. The PCIe root complex 2100 may be the PCIe root complex 318, 518 of FIGS. 3 and 5. The PCIe root complex 2100 natively generates encapsulated SAS traffic in a PCIe domain. The software driver 2102 translates the SCSI protocol layer that interfaces with the operating system into native encapsulated SAS traffic in the PCIe domain. The PCIe may pass to the input/output controller 2104 (for example the input/output controller 1600 of FIG. 16).

Figure 22:
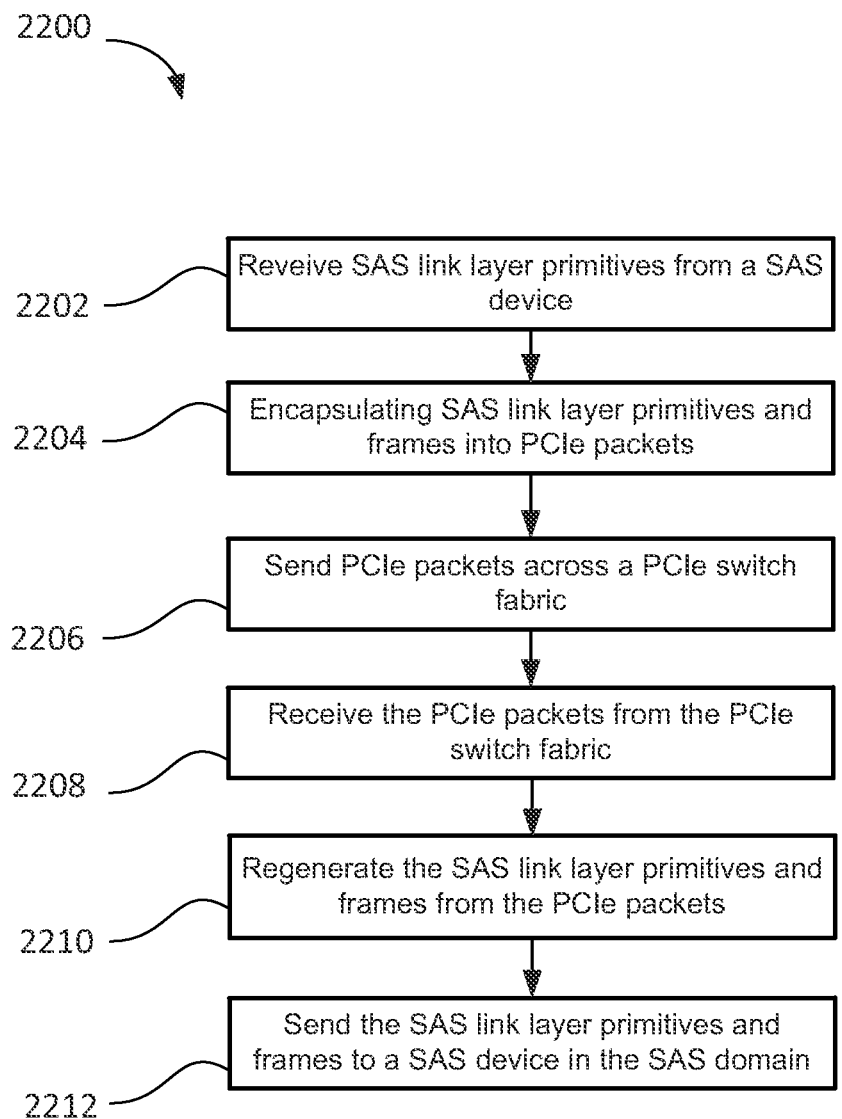
FIG. 22 is a method for transporting SAS protocol data across a PCIe link, in accordance with an embodiment.

FIG. 22 illustrates a method 2200 for transporting SAS protocol data across a PCIe link, in accordance with an embodiment. Where a SAS-PCIe bridge is presented to a SAS domain as a standard SAS expander, the existence of the PCIe link is hidden from the SAS domain. A SAS device sends SAS data over a SAS domain to a first PCIe bridge. The first PCIe bridge receives the SAS data having SAS link layer primitives and frames from the SAS device at 2202. At 2204, the first SAS-PCIe bridge encapsulates the SAS link layer primitives and frames into PCIe packets.

In an embodiment, encapsulating the SAS link layer primitives and frames into packets uses PCIe memory write TLPs. In an embodiment, encapsulating the SAS link layer primitives and frames into packets uses protocol multiplexing extensions for PCIe protocol. In a further variant, encapsulating the SAS link layer primitives and frames into packets uses a modified PCIe switch for transporting proprietary packets.

At 2206, the first SAS-PCIe bridge sends the PCIe packets across a PCIe switch fabric. PCIe switches transfer the PCIe packets to a second SAS-PCIe bridge. At 2208, the second SAS-PCIe bridge receives the PCIe packets from the PCIe switch fabric. At 2210, the second SAS-PCIe bridge regenerates the SAS link layer primitives and frames from the PCIe packets. At 2212, the second SAS-PCIe bridge sends the regenerated SAS data to a second SAS device in the SAS domain.

While systems and methods for transmitting SAS over PCIe is described herein, it will be understood that PCIe over SAS may be similarly performed.

The present disclosure describes a method and system that enables a unified standard interconnect for both SAS and PCIe traffic. This reduces system cost by reducing the number of cables, connectors and board traces required to achieve the same type of system. Cost is also reduced by reducing the number of components required to achieve the same result.

Transporting SAS protocol over a packetized network such as PCIe also has the potential benefit of reducing the maximum latency in a system. SAS protocol is susceptible to long latencies when shared link resources are blocked by length connections. Since PCIe is a packet-switched network, individual packets do not need to wait for end-to-end connections to complete before making progress.

The present disclosure describes a system that enjoys the benefits of both SAS capacity and PCIe performance without compromising either attribute, providing value to storage system designers.

It may be desirable to provide a method that uses native PCIe links as the transport technology and bridges SAS devices so that their traffic can be carried on the PCIe links. While, bridging protocols may add latency to the original traffic, this method has the benefit of leaving the PCIe-based storage traffic operating with the lowest latency possible because it is carried as native PCIe without protocol bridging.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A serial attached small computer system interface (SAS)—peripheral component interconnect express (PCIe) bridge for enabling interoperability between a SAS protocol and a PCIe protocol, the SAS-PCIe bridge comprising:
   a SAS component configured to communicate with a SAS device in a SAS domain; and
   a PCIe component configured to communicate with a PCIe switch in a PCIe domain;
   the SAS component and the PCIe component being configured to convert data between the SAS protocol and the PCIe protocol, the data including SAS data having SAS link layer primitives and frames,
   the PCIe component being configured to encapsulate the SAS link layer primitives and frames into PCIe packets.

2. The SAS-PCIe bridge of claim 1, wherein:
   the SAS component is configured to receive the SAS data from a SAS device in the SAS domain; and
   the PCIe component is configured to send the PCIe packets to a second SAS-PCIe bridge in the PCIe domain.

3. The SAS PCIe bridge of claim 2, wherein the second SAS-PCIe bridge is configured to regenerate the SAS data from the PCIe packets.

4. The SAS-PCIe bridge of claim 1, wherein the data includes PCIe data having PCIe packets and wherein the PCIe component is configured to:
   generate SAS link layer primitives and frames from the PCIe packets.

5. The SAS-PCIe bridge of claim 4, wherein:
   the PCIe component is configured to receive the PCIe packets; and
   the SAS component is configured to send the SAS link layer primitives and frames to the SAS device in the SAS domain.

6. The SAS-PCIe bridge of claim 1, wherein the SAS component is presented to the SAS device as a standard SAS expander.

7. The SAS-PCIe bridge of claim 1, wherein the SAS component and the PCIe component convert the data between the SAS protocol and the PCIe protocol using PCIe memory write transport layer packets.

8. The SAS-PCIe bridge of claim 1, wherein the SAS component and the PCIe component convert the data between the SAS protocol and the PCIe protocol using PCIe protocol multiplexing extensions.

9. The SAS-PCIe bridge of claim 1, wherein the SAS component and the PCIe component convert the data between the SAS protocol and the PCIe protocol using proprietary PCIe packets.

10. A method for enabling interoperability between a serial attached small computer system interface (SAS) protocol and a peripheral component interconnect express (PCIe) protocol, the method comprising:
   receiving SAS link layer primitives and frames from a SAS device in a SAS domain;
   encapsulating the SAS link layer primitives and frames into PCIe packets; and
   sending the PCIe packets to a PCIe switch in a PCIe domain.

11. The method of claim 10, wherein the PCIe packets comprise PCIe memory write transport layer packets.

12. The method of claim 10, wherein the PCIe packets use PCIe protocol multiplexing extensions.

13. The method of claim 10, wherein the PCIe packets comprise proprietary PCIe packets.

14. A method for enabling interoperability between a serial attached small computer system interface (SAS) protocol and a peripheral component interconnect express (PCIe) protocol, the method comprising:
   receiving data including SAS data having SAS link layer primitives and frames from a SAS device in a SAS domain;
   encapsulating the SAS link layer primitives and frames into PCIe packets; and
   sending the PCIe packets to a PCIe switch in the PCIe domain.

15. The method of claim 14, wherein the PCIe packets include PCIe memory write transport layer packets.

16. The method of claim 14, wherein the PCIe packets use PCIe protocol multiplexing extensions.

17. The method of claim 14, wherein the PCIe packets include proprietary PCIe packets.

18. A data communications device comprising:
   a serial attached small computer system interface (SAS)—peripheral component interconnect express (PCIe) bridge for enabling interoperability between a SAS protocol and a PCIe protocol, the SAS-PCIe bridge comprising:
      a SAS component configured to communicate with a SAS device in a SAS domain; and
      a PCIe component configured to communicate with a PCIe switch in a PCIe domain;
      the SAS component and the PCIe component being configured to convert data between the SAS protocol and the PCIe protocol, the data including SAS data having SAS link layer primitives and frames,
      the PCIe component being configured to encapsulate the SAS link layer primitives and frames into PCIe packets.

19. The data communications device of claim 18 wherein the data communications device comprises an input-output controller.

* * * * *